US007889280B2

(12) United States Patent
Osawa

(10) Patent No.: US 7,889,280 B2
(45) Date of Patent: Feb. 15, 2011

(54) IMAGE PROCESSING APPARATUS AND METHOD THEREOF

(75) Inventor: Seiji Osawa, Aiko-gun (JP)

(73) Assignee: Canon Kabushiki Kaisha, Tokyo (JP)

( * ) Notice: Subject to any disclaimer, the term of this patent is extended or adjusted under 35 U.S.C. 154(b) by 785 days.

(21) Appl. No.: 11/846,610

(22) Filed: Aug. 29, 2007

(65) Prior Publication Data

US 2008/0055473 A1 Mar. 6, 2008

(30) Foreign Application Priority Data

Sep. 6, 2006 (JP) ............................ 2006-242145

(51) Int. Cl.
*H04N 5/00* (2006.01)
*H04N 5/14* (2006.01)
*H04N 9/64* (2006.01)
*H04N 9/74* (2006.01)
*H04N 5/21* (2006.01)
*G06K 9/34* (2006.01)
*G06K 9/40* (2006.01)

(52) U.S. Cl. ....................... 348/650; 348/577; 348/582; 348/617; 348/630; 382/164; 382/173; 382/254

(58) Field of Classification Search ................. 348/577, 348/582, 617, 630, 650; 382/164, 173, 254; 358/1.2, 1.9, 518
See application file for complete search history.

(56) References Cited

U.S. PATENT DOCUMENTS 5,900,862 A * 5/1999 Silverbrook et al. ........ 345/603
6,208,693 B1 * 3/2001 Chen et al. ............. 375/240.24
6,577,759 B1 * 6/2003 Caron et al. ................ 382/164
6,816,613 B2 11/2004 Tohyama et al.
6,832,000 B2 * 12/2004 Herman et al. .............. 382/165
6,903,782 B2 * 6/2005 Herman et al. .............. 348/625
7,215,814 B2 * 5/2007 Suzuki ....................... 382/167
7,386,167 B2 * 6/2008 Imamura .................... 382/164
7,426,296 B2 * 9/2008 Lee et al. .................... 382/165
7,444,017 B2 * 10/2008 Gallagher ................... 382/167
7,664,322 B1 * 2/2010 Wilensky .................... 382/181
7,664,335 B2 * 2/2010 Kurumisawa et al. ....... 382/254
2002/0106122 A1 * 8/2002 Messing et al. ............. 382/162
2002/0140815 A1 * 10/2002 Herman et al. .............. 348/180
2003/0002732 A1 * 1/2003 Gossett et al. .............. 382/164
2003/0194126 A1 * 10/2003 Shin et al. ................... 382/164

(Continued)

FOREIGN PATENT DOCUMENTS

EP 1395038 3/2004

(Continued)

OTHER PUBLICATIONS

Office Action dated Aug. 18, 2008 in JP 2006-242145.

*Primary Examiner*—Brian Yenke
(74) *Attorney, Agent, or Firm*—Fitzpatrick, Cella, Harper & Scinto

(57) ABSTRACT

Chroma correction is executed in consideration of the area effect of colors. To this end, an input image is segmented into a plurality of regions as sets of pixels having similar feature amounts, and a size evaluation value of the each segmented regions is calculated based on the number of pixels and a shape of the each segmented region. Chroma correction is applied to the input image to weaken correction as the region has a larger size evaluation value.

14 Claims, 25 Drawing Sheets

| LABEL NUMBER | FEATURE AMOUNTS | | | TOP END | BOTTOM END | LEFT END | RIGHT END | NUMBER OF PIXELS | SIZE |
|---|---|---|---|---|---|---|---|---|---|
| | Y | Cb | Cr | Y0 | Y1 | X0 | X1 | N | V |
| 1 | 120 | 201 | 55 | 0 | 380 | 0 | 270 | 73201 | 52067 |
| 2 | 150 | 201 | 30 | 0 | 605 | 2 | 921 | 506937 | 333917 |
| ........ | ........ | ........ | ........ | ........ | ........ | ........ | ........ | ........ | |
| 15 | 82 | 90 | 145 | 0 | 700 | 1200 | 1919 | 35726 | 34783 |
| ........ | ........ | ........ | ........ | ........ | ........ | ........ | ........ | ........ | |
| 28 | 95 | 65 | 165 | 1 | 1 | 1919 | 1919 | 1 | 1 |
| ........ | ........ | ........ | ........ | ........ | ........ | ........ | ........ | ........ | |
| 107 | 230 | 121 | 125 | 619 | 1079 | 0 | 1192 | 509874 | 197026 |
| ........ | ........ | ........ | ........ | ........ | ........ | ........ | ........ | ........ | |
| 191 | 100 | 130 | 130 | 1078 | 1079 | 2 | 2 | 2 | 1 |
| ........ | ........ | ........ | ........ | ........ | ........ | ........ | ........ | ........ | |
| 202 | 120 | 201 | 55 | 720 | 1079 | 812 | 1919 | 25813 | 8387 |

U.S. PATENT DOCUMENTS

2004/0036892 A1 2/2004 Ito et al. ...................... 358/1.2

FOREIGN PATENT DOCUMENTS

| | | |
|---|---|---|
| JP | 4-207772 | 7/1992 |
| JP | 3370770 | 10/1995 |
| JP | 2001-292333 | 10/2001 |
| JP | 2001-339602 | 12/2001 |
| JP | 2003-271973 | 9/2003 |
| JP | 2004/094680 | 3/2004 |
| JP | 2004-192614 | 7/2004 |

* cited by examiner

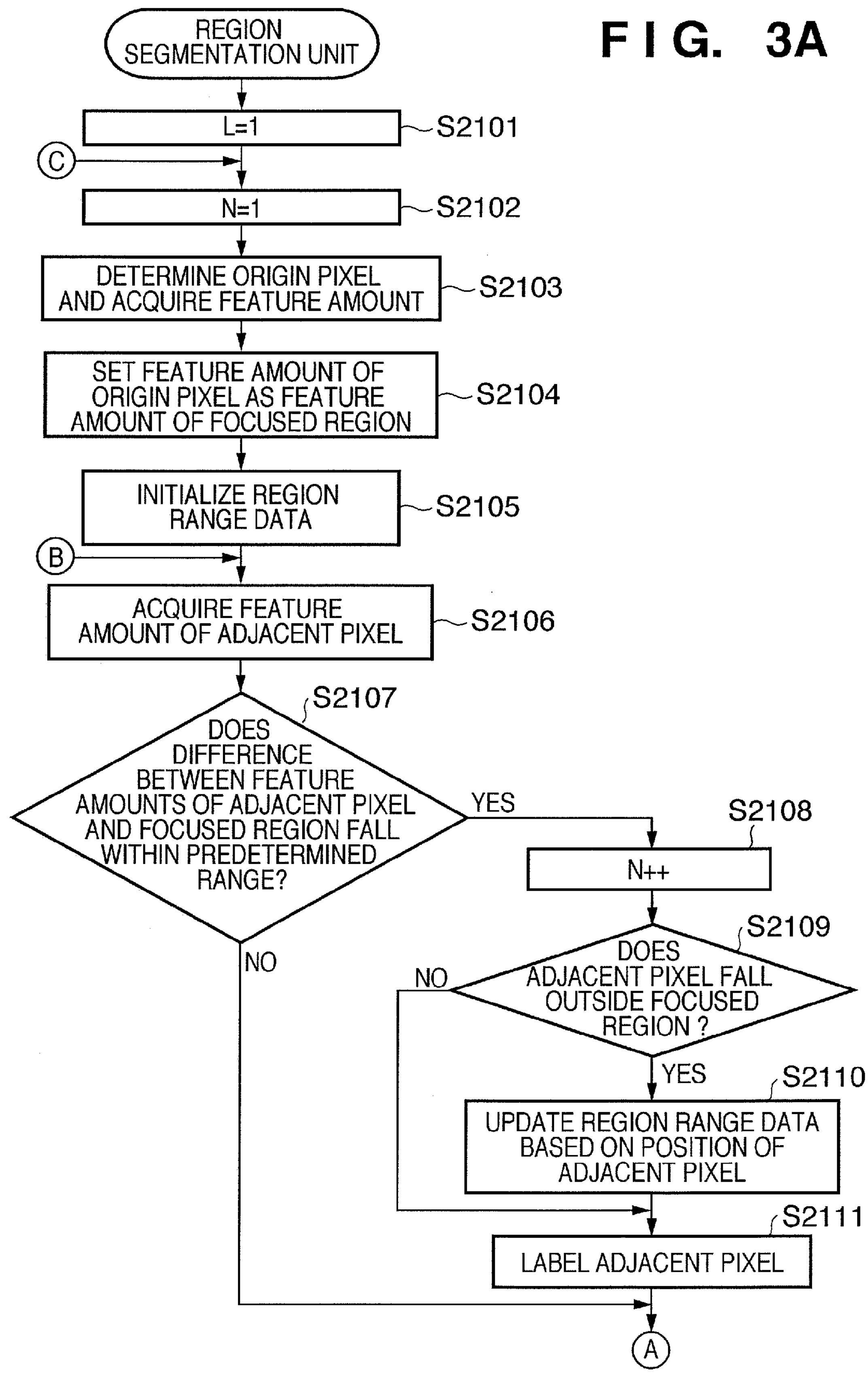
F I G. 3A 101
201
250
MEMORY
CHROMA CORRECTOR
IMAGE DATA
IMAGE STORAGE AREA
CHROMA CORRECTION PROCESSOR
OUTPUT
REGION INFORMATION STORAGE AREA
103
104
102
LABEL STORAGE AREA
CORRECTION COEFFICIENT STORAGE AREA
252
C
251
210
211
REGION SEGMENTATION PROCESSOR
SIZE CALCULATOR
CORRECTION COEFFICIENT CALCULATOR
FILTER PROCESSOR
E
212
THRESHOLD DETERMINATION UNIT
REGION SEGMENTATION UNIT
220
230
240

FIG. 9

| | x = 0 | 1 | 2 | ........ | ........ | 1918 | 1919 |
|---|---|---|---|---|---|---|---|
| y = 0 | Y : 120<br>Cb : 201<br>Cr : 55 | Y : 127<br>Cb : 198<br>Cr : 58 | Y : 150<br>Cb : 201<br>Cr : 30 | | | Y : 80<br>Cb : 88<br>Cr : 145 | Y : 90<br>Cb : 89<br>Cr : 139 |
| 1 | Y : 119<br>Cb : 203<br>Cr : 57 | Y : 120<br>Cb : 201<br>Cr : 55 | Y : 145<br>Cb : 207<br>Cr : 32 | ........ | | Y : 81<br>Cb : 83<br>Cr : 150 | Y : 95<br>Cb : 65<br>Cr : 165 |
| 2 | Y : 130<br>Cb : 199<br>Cr : 50 | Y : 118<br>Cb : 209<br>Cr : 51 | Y : 120<br>Cb : 207<br>Cr : 53 | | | Y : 87<br>Cb : 81<br>Cr : 151 | Y : 80<br>Cb : 85<br>Cr : 140 |
| ........ | | ........ | | ........ | | ........ | |
| 1078 | Y : 225<br>Cb : 120<br>Cr : 128 | Y : 219<br>Cb : 125<br>Cr : 127 | Y : 100<br>Cb : 130<br>Cr : 130 | | | Y : 120<br>Cb : 201<br>Cr : 55 | Y : 120<br>Cb : 207<br>Cr : 50 |
| 1079 | Y : 221<br>Cb : 127<br>Cr : 125 | Y : 215<br>Cb : 119<br>Cr : 123 | Y : 101<br>Cb : 135<br>Cr : 125 | ........ | | Y : 123<br>Cb : 198<br>Cr : 48 | Y : 125<br>Cb : 205<br>Cr : 55 |

FIG. 10

|  | x = 0 | 1 | 2 | ........ | ........ | 1918 | 1919 |
|---|---|---|---|---|---|---|---|
| y = 0 | 1 | 1 | 2 | ........ |  | 15 | 15 |
| 1 | 1 | 1 | 2 |  |  | 15 | 28 |
| 2 | 1 | 1 | 1 |  |  | 15 | 15 |
| ........ | ........ |  |  | ........ |  | ........ |  |
| 1078 | 107 | 107 | 191 | ........ |  | 202 | 202 |
| 1079 | 107 | 107 | 191 |  |  | 202 | 202 |

FIG. 11

| LABEL NUMBER | FEATURE AMOUNTS | | | TOP END | BOTTOM END | LEFT END | RIGHT END | NUMBER OF PIXELS | SIZE |
|---|---|---|---|---|---|---|---|---|---|
| | Y | Cb | Cr | Y0 | Y1 | X0 | X1 | N | V |
| 1 | 120 | 201 | 55 | 0 | 380 | 0 | 270 | 73201 | 52067 |
| 2 | 150 | 201 | 30 | 0 | 605 | 2 | 921 | 506937 | 333917 |
| ........ | ........ | ........ | ........ | ........ | ........ | ........ | ........ | ........ | |
| 15 | 82 | 90 | 145 | 0 | 700 | 1200 | 1919 | 35726 | 34783 |
| ........ | ........ | ........ | ........ | ........ | ........ | ........ | ........ | ........ | |
| 28 | 95 | 65 | 165 | 1 | 1 | 1919 | 1919 | 1 | 1 |
| ........ | ........ | ........ | ........ | ........ | ........ | ........ | ........ | ........ | |
| 107 | 230 | 121 | 125 | 619 | 1079 | 0 | 1192 | 509874 | 197026 |
| ........ | ........ | ........ | ........ | ........ | ........ | ........ | ........ | ........ | |
| 191 | 100 | 130 | 130 | 1078 | 1079 | 2 | 2 | 2 | 1 |
| ........ | ........ | ........ | ........ | ........ | ........ | ........ | ........ | ........ | |
| 202 | 120 | 201 | 55 | 720 | 1079 | 812 | 1919 | 25813 | 8387 |

FIG. 12

| | x = 0 | 1 | 2 | ........ | ........ | 1918 | 1919 |
|---|---|---|---|---|---|---|---|
| y = 0 | 0.987 | 0.987 | 0.915 | | | 0.991 | 0.991 |
| 1 | 0.987 | 0.987 | 0.915 | ........ | | 0.991 | 1.000 |
| 2 | 0.987 | 0.987 | 0.987 | | | 0.991 | 0.991 |
| ........ | ........ | | | ........ | | ........ | |
| 1078 | 0.950 | 0.950 | 1.000 | ........ | | 0.998 | 0.998 |
| 1079 | 0.950 | 0.950 | 1.000 | | | 0.998 | 0.998 |

FIG. 13

| | x = 0 | 1 | 2 | ........ | 1918 | 1919 |
|---|---|---|---|---|---|---|
| y = 0 | Y : 120<br>Cb : 236<br>Cr : 19 | Y : 127<br>Cb : 231<br>Cr : 24 | Y : 150<br>Cb : 228<br>Cr : 16 | ........ | Y : 80<br>Cb : 68<br>Cr : 153 | Y : 90<br>Cb : 70<br>Cr : 144 |
| 1 | Y : 119<br>Cb : 239<br>Cr : 22 | Y : 120<br>Cb : 236<br>Cr : 19 | Y : 145<br>Cb : 236<br>Cr : 16 | | Y : 81<br>Cb : 61<br>Cr : 160 | Y : 95<br>Cb : 33<br>Cr : 183 |
| 2 | Y : 130<br>Cb : 233<br>Cr : 16 | Y : 118<br>Cb : 240<br>Cr : 16 | Y : 120<br>Cb : 240<br>Cr : 16 | | Y : 87<br>Cb : 58<br>Cr : 162 | Y : 80<br>Cb : 64<br>Cr : 145 |
| ........ | ........ | | | ........ | ........ | |
| 1078 | Y : 240<br>Cb : 116<br>Cr : 128 | Y : 239<br>Cb : 123<br>Cr : 126 | Y : 100<br>Cb : 131<br>Cr : 131 | ........ | Y : 120<br>Cb : 237<br>Cr : 18 | Y : 120<br>Cb : 240<br>Cr : 16 |
| 1079 | Y : 241<br>Cb : 126<br>Cr : 123 | Y : 235<br>Cb : 115<br>Cr : 120 | Y : 101<br>Cb : 138<br>Cr : 123 | | Y : 123<br>Cb : 232<br>Cr : 16 | Y : 125<br>Cb : 240<br>Cr : 18 |

FIG. 14

| | x = 0 | 1 | 2 | ........ | ........ | 1918 | 1919 |
|---|---|---|---|---|---|---|---|
| y = 0 | 1 | 1 | 2 | | | 5 | 5 |
| 1 | 1 | 1 | 2 | ........ | | 5 | 0 |
| 2 | 1 | 1 | 1 | | | 5 | 5 |
| ........ | ........ | | | ........ | | ........ | |
| 1078 | 17 | 17 | 0 | | | 22 | 22 |
| 1079 | 17 | 17 | 0 | ........ | | 22 | 22 |

FIG. 15

| LABEL NUMBER | COLOR INFORMATION | | | TOP END Y0 | BOTTOM END Y1 | LEFT END X0 | RIGHT END X1 | NUMBER OF PIXELS N | SIZE V |
|---|---|---|---|---|---|---|---|---|---|
| | Y | Cb | Cr | | | | | | |
| 1 | 120 | 201 | 55 | 0 | 380 | 0 | 270 | 73201 | 52067 |
| 2 | 150 | 201 | 30 | 0 | 605 | 2 | 921 | 506937 | 333917 |
| ........ | ........ | ........ | ........ | ........ | ........ | ........ | ........ | ........ | ........ |
| 5 | 82 | 90 | 145 | 0 | 700 | 1200 | 1919 | 35726 | 34783 |
| ........ | ........ | ........ | ........ | ........ | ........ | ........ | ........ | ........ | ........ |
| 17 | 230 | 121 | 125 | 619 | 1079 | 0 | 1192 | 509874 | 197026 |
| ........ | ........ | ........ | ........ | ........ | ........ | ........ | ........ | ........ | ........ |
| 22 | 120 | 201 | 55 | 720 | 1079 | 812 | 1919 | 25813 | 8387 |

FIG. 16

| | x = 0 | 1 | 2 | ........ | ........ | 1918 | 1919 |
|---|---|---|---|---|---|---|---|
| y = 0 | 0.989 | 0.989 | 0.917 | | | 0.993 | 0.993 |
| 1 | 0.989 | 0.989 | 0.917 | ........ | | 0.993 | 1.000 |
| 2 | 0.989 | 0.989 | 0.989 | | | 0.993 | 0.993 |
| ........ | ........ | | | ........ | | ........ | |
| 1078 | 0.952 | 0.952 | 1.000 | ........ | | 1.000 | 1.000 |
| 1079 | 0.952 | 0.952 | 1.000 | | | 1.000 | 1.000 |

FIG. 17

| | x = 0 | 1 | 2 | ........ | ........ | 1918 | 1919 |
|---|---|---|---|---|---|---|---|
| y = 0 | Y : 120<br>Cb : 236<br>Cr : 19 | Y : 127<br>Cb : 231<br>Cr : 24 | Y : 150<br>Cb : 228<br>Cr : 16 | | | Y : 80<br>Cb : 68<br>Cr : 153 | Y : 90<br>Cb : 69<br>Cr : 144 |
| 1 | Y : 119<br>Cb : 239<br>Cr : 22 | Y : 120<br>Cb : 236<br>Cr : 19 | Y : 145<br>Cb : 236<br>Cr : 16 | ........ | | Y : 81<br>Cb : 60<br>Cr : 160 | Y : 95<br>Cb : 33<br>Cr : 183 |
| 2 | Y : 130<br>Cb : 233<br>Cr : 16 | Y : 118<br>Cb : 240<br>Cr : 16 | Y : 120<br>Cb : 240<br>Cr : 16 | | | Y : 87<br>Cb : 57<br>Cr : 162 | Y : 80<br>Cb : 63<br>Cr : 145 |
| ........ | | ........ | | ........ | | ........ | |
| 1078 | Y : 225<br>Cb : 116<br>Cr : 128 | Y : 219<br>Cb : 123<br>Cr : 126 | Y : 100<br>Cb : 131<br>Cr : 131 | | | Y : 120<br>Cb : 237<br>Cr : 18 | Y : 120<br>Cb : 240<br>Cr : 16 |
| 1079 | Y : 221<br>Cb : 126<br>Cr : 123 | Y : 215<br>Cb : 115<br>Cr : 120 | Y : 101<br>Cb : 138<br>Cr : 123 | ........ | | Y : 123<br>Cb : 232<br>Cr : 16 | Y : 125<br>Cb : 240<br>Cr : 18 |

FIG. 18

| | x = 0 | 1 | 2 | ........ ........ | 1918 | 1919 |
|---|---|---|---|---|---|---|
| y = 0 | 0.989 | 0.965 | 0.941 | | 0.994 | 0.995 |
| 1 | 0.989 | 0.973 | 0.957 | ........ | 0.994 | 0.995 |
| 2 | 0.989 | 0.981 | 0.973 | | 0.994 | 0.995 |
| ........ | | | | ........ | ........ | |
| 1078 | 0.952 | 0.963 | 0.967 | ........ | 0.994 | 1.000 |
| 1079 | 0.952 | 0.968 | 0.972 | | 0.991 | 1.000 |

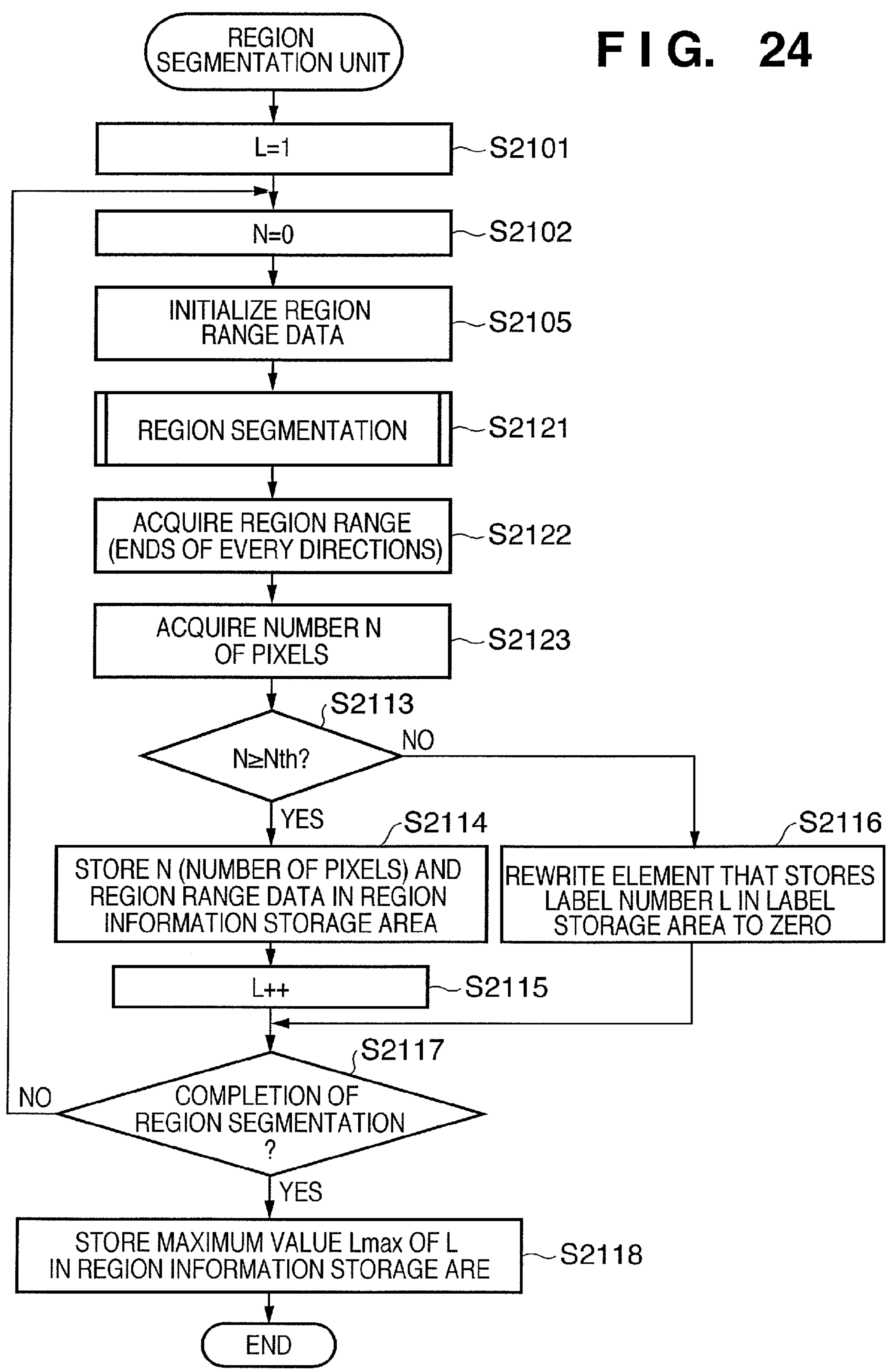

FIG. 24
REGION SEGMENTATION UNIT
L=1
S2101
N=0
S2102
INITIALIZE REGION RANGE DATA
S2105
REGION SEGMENTATION
S2121
ACQUIRE REGION RANGE (ENDS OF EVERY DIRECTIONS)
S2122
ACQUIRE NUMBER N OF PIXELS
S2123
S2113
N≥Nth?
NO
YES
S2114
STORE N (NUMBER OF PIXELS) AND REGION RANGE DATA IN REGION INFORMATION STORAGE AREA
S2116
REWRITE ELEMENT THAT STORES LABEL NUMBER L IN LABEL STORAGE AREA TO ZERO
L++
S2115
S2117
NO
COMPLETION OF REGION SEGMENTATION ?
YES
STORE MAXIMUM VALUE Lmax OF L IN REGION INFORMATION STORAGE ARE
S2118
END

IMAGE PROCESSING APPARATUS AND METHOD THEREOF

BACKGROUND OF THE INVENTION

1. Field of the Invention

The present invention relates to image processing for chroma-correcting an image.

2. Description of the Related Art

Chroma correction processing that corrects the chroma of an image to enhance the brightness of the image and to improve appearance of the image is available.

On the other hand, as a human visual characteristic, a phenomenon called an area effect of colors is known. The area effect of colors is a phenomenon in which one may perceive different lightness and chroma levels of objects depending on their apparent sizes. For example, even when objects have the same color, when one object has a large apparent size in an image, one perceives it to have higher lightness and chroma levels than the other objects with a smaller apparent size. Due to this area effect of colors, a phenomenon in which one perceives different object colors in an image depending on their different visual sizes occurs. For example, if there are regions having the same color but different sizes, one perceives that the larger region has a higher chroma level and is brighter than the smaller region.

As the chroma correction processing, a technique for applying chroma correction to respective pixels of an image according to an amount of chroma correction is available. With this technique, upon uniformly applying chroma correction to an image, a desired effect can be obtained on image data. However, the chroma level changes depending on the apparent sizes of regions due to the area effect of colors, and a desired effect cannot often be obtained. That is, chroma correction must be applied according to the apparent sizes of regions.

Japanese Patent No. 3370770 discloses an invention that corrects a chroma level according to the area of a human skin color in an image. More specifically, that invention detects the area of a skin color region (to be referred to as a skin color area hereinafter) in one frame from color-difference signals, detects the average luminance of the frame from a luminance signal, and determines the amount of skin color correction of that frame based on the average luminance and skin color area. Then, the invention corrects a luminance signal and color-difference signals corresponding to the skin color region according to the amount of skin color correction.

Japanese Patent Laid-Open No. 2004-192614 discloses an invention that corrects a memory color included in image data into a favorable color. More specifically, this invention calculates characteristic values from image data, and extracts a specific color region of a correction target and its background region from the characteristic values and color information of the memory color. The invention calculates a target value of color correction of a favorable color based on the characteristic values, extraction result, and favorable color information, and corrects respective colors of the specific color region based on the target value of color correction and characteristic values. The characteristic values include the average chromaticity of the specific color region, and the occupation ratio of the specific color region to an image area.

However, if there are a large number of small skin color regions in one frame, the technique of Japanese Patent No. 3370770 determines an amount of skin color correction according to the total of areas of these skin color regions, and applies uniform correction to the respective skin color regions. Therefore, this technique cannot appropriately correct each individual skin color region. Also, the technique of Japanese Patent No. 3370770 does not apply color correction to regions other than skin color regions, and the technique of Japanese Patent Laid-Open No. 2004-192614 does not apply color correction to color regions other than the memory color.

SUMMARY OF THE INVENTION

In one aspect, an image processing method comprising the steps of segmenting an input image into a plurality of regions as sets of pixels having similar feature amounts; calculating a size evaluation value of each segmented region based on the number of pixels and a shape of the each segmented region, and applying chroma correction to the input image to weaken correction as a region has a larger size evaluation value.

According to the aspect, chroma correction can be implemented in consideration of the area effect of colors.

Further features of the present invention will become apparent from the following description of exemplary embodiments with reference to the attached drawings.

BRIEF DESCRIPTION OF THE DRAWINGS

FIGS. 3A and 3B are flowcharts for explaining the processing to be executed by a region segmentation unit;

FIG. 9 shows image data of an input image;

FIG. 10 shows a region segmentation result of the image data shown in FIG. 9;

FIG. 11 shows region information of respective regions;

FIG. 12 shows coefficients of chroma correction of respective pixels;

FIG. 13 shows image data after chroma correction;

FIG. 14 shows a region segmentation result of the image data shown in FIG. 9;

FIG. 15 shows region information of respective regions;

FIG. 16 shows coefficients of chroma correction of respective pixels;

FIG. 17 shows image data after chroma correction;

FIG. 18 shows a data example stored in a correction coefficient storage area after filtering;

FIG. 24 is a flowchart showing the processing of a region segmentation unit according to the third embodiment.

DESCRIPTION OF THE EMBODIMENTS

An image processing apparatus according to embodiments of the present invention will be described in detail hereinafter with reference to the accompanying drawings.

First Embodiment

[Arrangement of Image Processing Apparatus]

Figure 1:
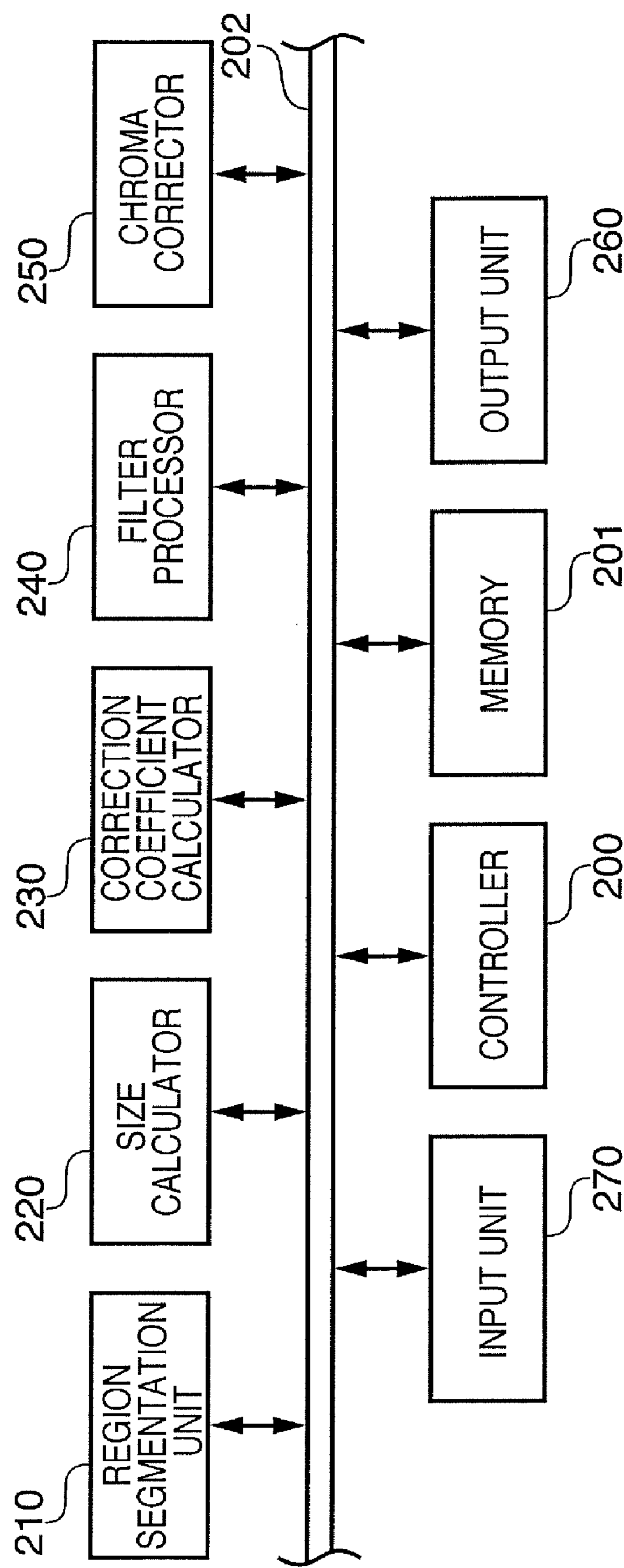
FIG. 1 is a block diagram showing the arrangement of an image processing apparatus according to one embodiment.

FIG. 1 is a block diagram showing the arrangement of an image processing apparatus according to one embodiment.

A region segmentation unit 210 segments an input image into regions. A size calculator 220 calculates the apparent sizes of respective regions as size evaluation values of the regions. A correction coefficient calculator 230 calculates coefficients of chroma correction according to the apparent sizes of respective regions. A filter processor 240 executes filtering according to the coefficients of correction. A chroma corrector 250 outputs an image that has undergone chroma correction. An input unit 270 is an interface which receives an image from an external device, and an output unit 260 is an interface which outputs an image to an external device.

A controller 200 dynamically assigns an area for storing an input image and a work area to a memory 201, controls the aforementioned processors to execute image processing to be described later via a system bus 202. Note that the memory 201 comprises a semiconductor memory. Also, a memory such as a hard disk or the like may be used as an auxiliary storage device.

As will be described in detail later, the size calculator 220 calculates a value indicating the apparent size of each region. Since the apparent size changes depending on the shape of the region even when the number of pixels remains the same, information indicating the apparent size is required. For example, a flat region looks small even when it has a large number of pixels.

In the following description, as for the pixel address of an image, x represents the horizontal direction, y represents the vertical direction, and the upper left pixel address of an image is (x, y)=(0, 0). If an image size is defined by M×N pixels, the address of the lower right pixel of the image is (x, y)=(M, N).

[Controller]

Figure 2:
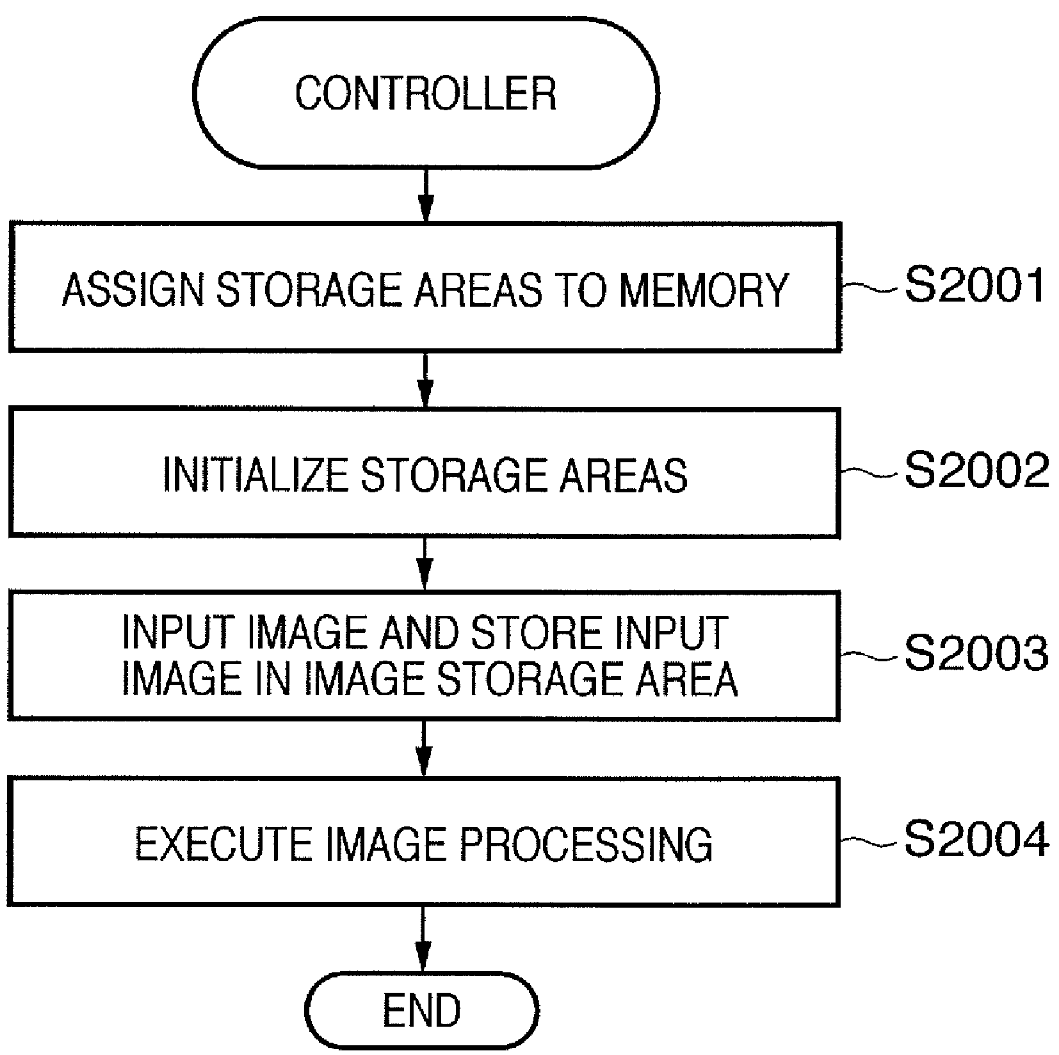
FIG. 2 is a flowchart for explaining the processing to be executed by a controller.

FIG. 2 is a flowchart for explaining the processing to be executed by the controller 200.

The controller 200 assigns the following areas to the memory 201 (S2001). That is, the areas to be assigned include an image storage area for storing an input image, a label storage area for storing label numbers appended to image regions, a region information storage area for storing the information of the areas and positions of respective image regions, a correction coefficient storage area for storing coefficients of correction, a work area used for respective processes, and the like.

The controller 200 initializes the storage areas assigned to the memory 201 (S2002). In this case, the controller 200 writes an initial value (e.g., 0) of corresponding information. However, an arbitrary value may be used as the initial value as long as it does not influence subsequent processes.

The controller 200 stores an image input from the input unit 270 in the image storage area (S2003). The image may have any of an LCh (lightness, chroma, hue) data format, RGB data format, and luminance/color-difference signal format such as YCbCr or the like. In the following description, assume that the image data is YCbCr data.

Upon storing an image for at least one frame in the image storage area, the controller 200 controls the respective processors to execute image processing (S2004).

[Region Segmentation Unit]

Region segmentation is processing for segmenting one image into a plurality of image regions as sets of pixels having similar feature amounts. The feature amounts include color information such as lightness, chroma, hue, and the like, image signal information (RGB primary color signals, or YCbCr luminance and color difference signals), texture information, and the like. Upon processing an image of television broadcasting, YCbCr signals of a video signal are preferably used to obviate the need for conversion and the like.

As the region segmentation method, for example, a region growing method, statistical hypothesis testing method, integration method, separation method, separation/integration method, K-means method, and the like may be used. In this embodiment, since counting of the number of pixels of each region and detection of the top, bottom, right, and left ends (to be referred to as "ends of every directions" hereinafter) are done simultaneously, the region growing method is suitably used.

In the region growing method, a given pixel is defined as an origin, and the feature amount of that origin pixel is used as that of a region. If the difference between the feature amount of a pixel adjacent to the origin pixel and that of the region falls within a predetermined range, it is determined that the pixel adjacent to the origin pixel belongs to the same region as the origin pixel, and the same label as the origin pixel is appended to the pixel adjacent to the origin pixel. Subsequently, as for each pixel adjacent to the region (to be referred to as an "adjacent pixel" hereinafter), feature amount comparison is made to grow the region. If no adjacent pixel with a close feature amount remains, segmentation of one region is completed.

A method of selecting an origin pixel is arbitrary. For example, it is convenient to raster-scan pixels, and to select the first pixel to which no label is assigned as an origin. Respective regions segmented in this way are assigned labels with different numbers. A label with the same number is appended to an adjacent pixel determined to belong to the same region. The label numbers are stored in the label storage area for respective pixels.

Figure 3B:
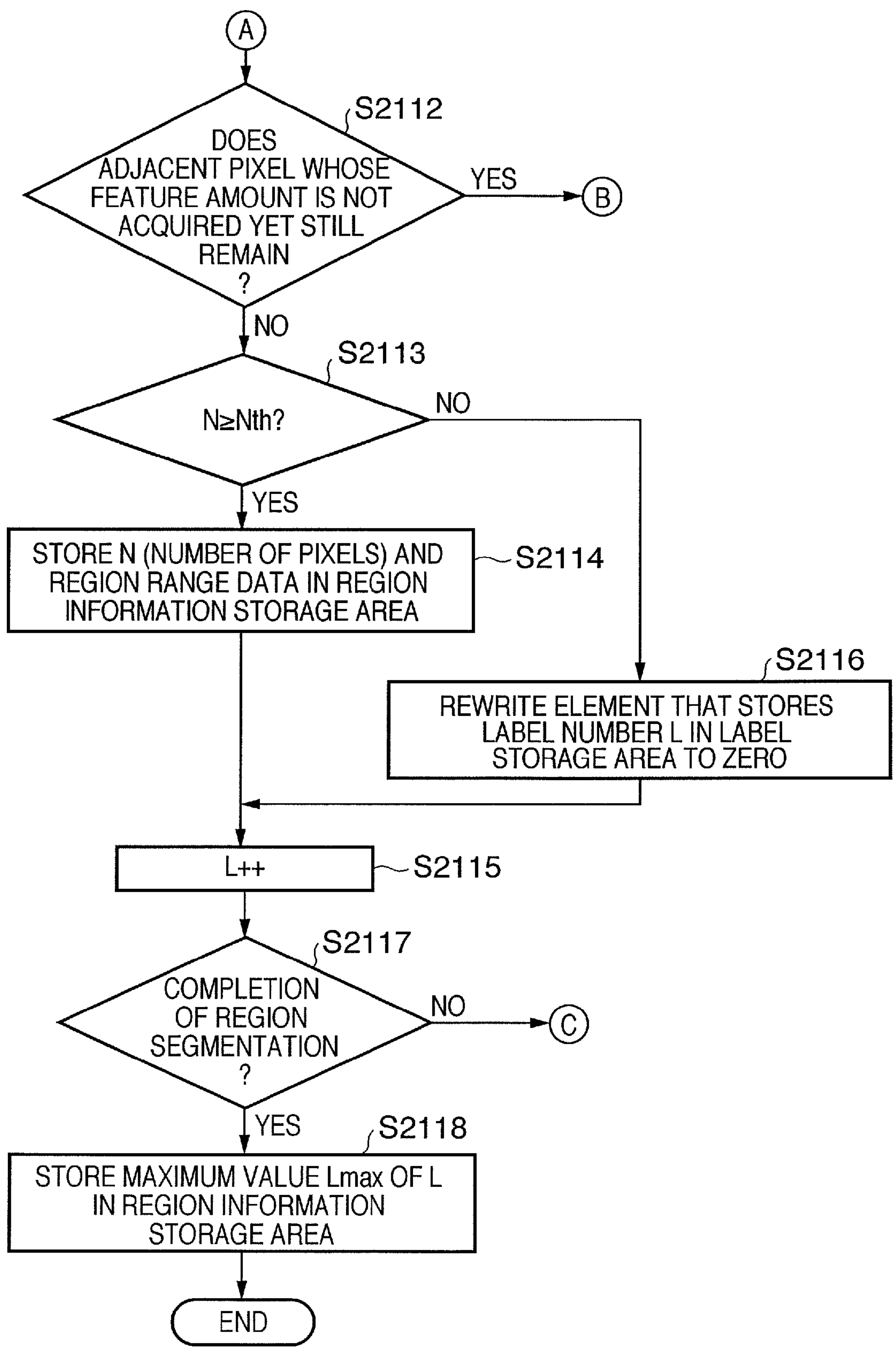

FIGS. 3A and 3B are flowcharts for explaining the processing to be executed by the region segmentation unit 210.

The region segmentation unit 210 sets a label number L to be 1 (S2101), and also sets a count value N to be 1 (S2102). The unit 210 then determines an origin pixel and acquires a feature amount of the origin pixel (S2103). The unit 210 sets the feature amount of the origin pixel as that of a focused region (S2104). The unit 210 then initializes data (to be referred to as "region range data" hereinafter) indicating the positions of the ends in every directions of the focused region based on the position of the origin pixel (S2105). The region range data is defined by an address (X0, Y0) of the upper left end of the regions and that (X1, Y1) of the lower right end. Initially, an address (x, y) of the origin pixel is set in both the addresses.

The region segmentation unit 210 acquires the feature amount of an adjacent pixel (S2106), and checks if the difference between the feature amounts of the adjacent pixel and the focused region falls within a predetermined range (S2107). As a result of checking, if the difference falls outside the predetermined range, the process jumps to step S2112.

If the difference between the feature amounts of the adjacent pixel and the focused region falls within the predetermined range, the region segmentation unit 210 increments the count value N (S2108). The unit 210 then checks if the adjacent pixel is located outside the focused region (a range indicated by the region range data) (S2109). If the adjacent pixel is located outside the focused region, the unit 210 updates the region range data based on the position of the adjacent pixel (S2110). Let (x1, y1) be the address of the adjacent pixel which is determined to belong to the focused region. Then, if X0≦x1≦X1 and Y0≦≦Y1, since the adjacent pixel is located within the focused region, the region range data need not be updated. However, if x1<X0 and Y0≦y1≦Y1, since the adjacent pixel is located on the left side of the left end of the focused region, X0 of the address (X0, Y0) of the upper left end of the region is updated to x1. Subsequently, the region segmentation unit 210 stores the label number L in a label storage area corresponding to the position of the adjacent pixel (S2111) to label the adjacent pixel and to add it to the focused region.

The region segmentation unit 210 checks if a pixel which is an adjacent pixel of the focused region and whose feature amount is not acquired yet still remains (S2112). As a result of checking, if a pixel whose feature amount is not acquired yet still remains, the process returns to step S2106 to repeat the processes in steps S2106 to S2111.

If no adjacent pixel whose feature amount is not acquired yet remains, the region segmentation unit 210 compares the count value N with a threshold Nth (S2113). As a result of comparison, if N≧Nth, the unit 210 stores the count value N in the region information storage area as the number NL of pixels and also the region range data in the region information storage area (S2114), and increments the label number L (S2115). If N<Nth, the unit 210 rewrites an element that stores the label number L in the label storage area to zero (S2116). Note that the label number "0" represents a pixel which does not belong to any region. Also, if N<Nth, the unit 210 does not update the label number L and uses it for labeling of the next region.

Since the threshold Nth is set to be a value obtained by dividing the total number of pixels of the image by a desired number of segmented regions, the number of segmented regions preferably falls within a desirable range. For example, upon segmenting an image of 1920 (horizontal)×1080 (vertical) pixels into a maximum of 250 regions, since 1920×1080÷250=8294.4, assuming Nth=8295 by counting fractions as one, the image is segmented into a maximum of 250 regions.

Next, the region segmentation unit 210 checks if the region segmentation is complete (S2117). When determining the origin pixel by the raster scan, completion of the region segmentation can be determined by checking whether or not the raster scan reaches a pixel at the lower right end of the image. Alternatively, completion of the region segmentation may be determined by checking if label numbers are assigned to all pixels. In this case, however, the initial value of the label storage area must be set to be a value other than zero and an expected label number. If it is determined that the region segmentation is not complete yet, the process returns to step S2102, and the unit 210 executes the next region segmentation. Note that an origin pixel of the next focused region is a pixel which is adjacent to the right side of the immediately preceding focused region. However, when the origin pixel position has reached the right end of the image, the next origin pixel is a pixel at the left end of the image.

If it is determined that the region segmentation is complete, the region segmentation unit 210 stores a maximum value Lmax of the label number L in the region information storage area (S2118), thus ending the processing. When the initial value of the region information storage area is set to be zero, the number $N_0$ of pixels with the label number L=0 is zero. However, when the initial value is set to be a value other than zero, the number $N_0$ of pixels must be set to be zero at that time. The size calculator 220 similarly processes the region with the label number L=0 in the same manner as other regions. In this case, by setting the number $N_0$ of pixels=0 of the region with the label number L=0, the calculation result about the set of pixels which do not belong to any region can be zero.

In the description of the above example, the number of pixels and range of each region are updated while executing the region segmentation. Alternatively, after segmentation of one region, or after completion of the region segmentation, the number of pixels and range of each region may be acquired. In the description of the above example, after segmentation of one region, the number of pixels of that region is checked, and if it is smaller than the threshold, the processing for rewriting the label number is executed. Alternatively, after completion of the region segmentation, the rewrite processing may be executed.

[Size Calculator]

Figure 4:
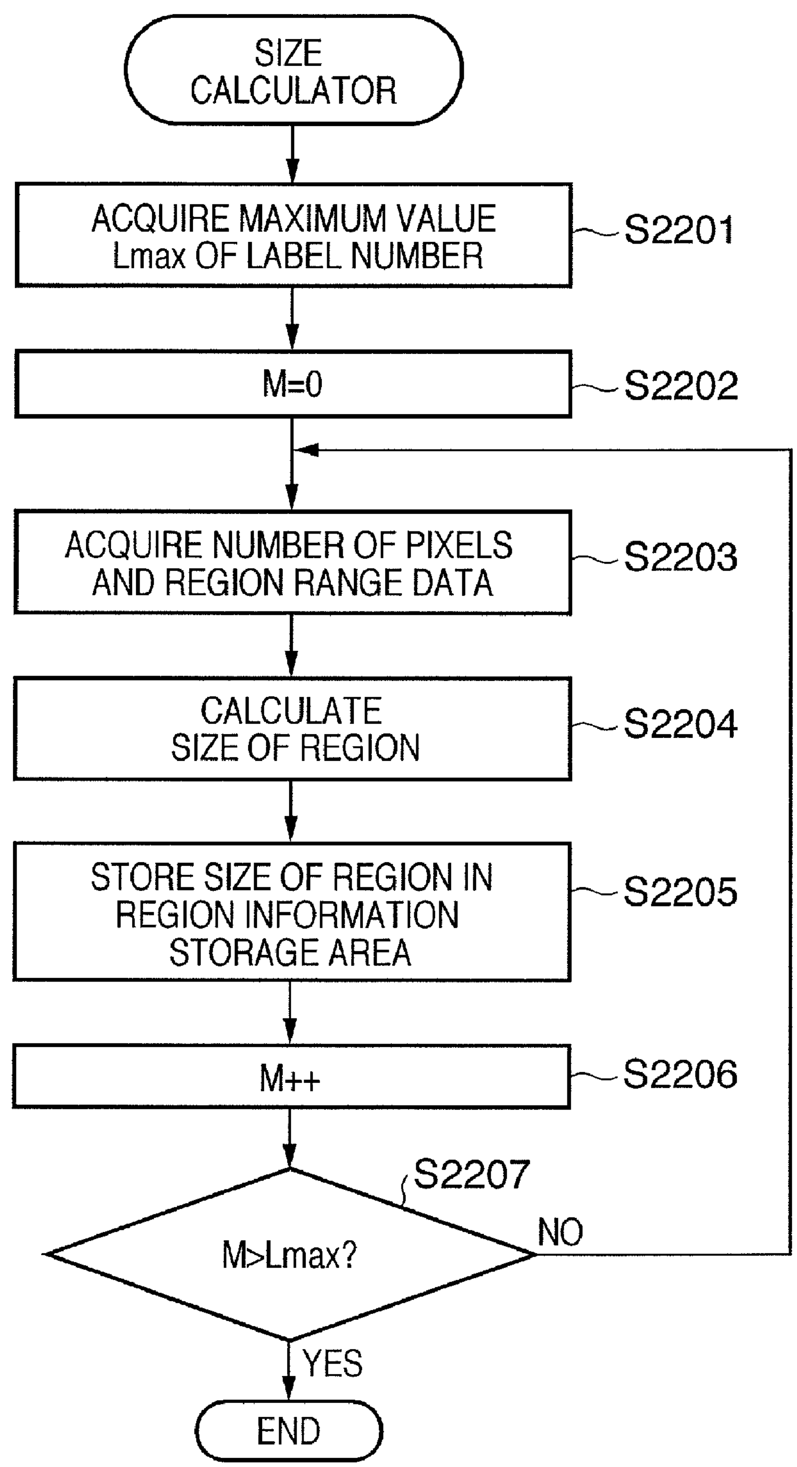
FIG. 4 is a flowchart showing the processing of a size calculator.

FIG. 4 is a flowchart showing the processing of the size calculator 220.

The size calculator 220 acquires the maximum value Lmax of the label number from the region information storage area (S2201), and initializes a counter M to zero (S2202).

Next, the size calculator 220 acquires the number $N_M$ of pixels and region range data of a region corresponding to the value of the counter M from the region information storage area (S2203), and calculates the apparent size of that region (S2204). A calculation example of the apparent size will be described below.

In the following description, various kinds of information of a given region A are expressed by the following symbols and the calculations of the apparent size will be explained.

V: apparent size (size evaluation value)

S: number $N_A$ of pixels

T: top end position $Y0_A$

B: bottom end position $Y1_A$

L: left end position $X0_A$

R: right end position $X1_A$

Also, let Max( ) be a function that outputs the maximum one of numerical values in parentheses, and Min( ) be a function that outputs the minimum one of numerical values in parentheses.

The size calculator 220 calculates the width W and height H of the region first.

$$W=R-L+1$$

$$H=B-T+1 \tag{1}$$

The size calculator 220 then calculates the apparent size V based on W and H. In this case, the following calculation methods are available.

$$V=S\times \mathrm{Min}(W,H)/\mathrm{Max}(W,H) \tag{2}$$

$$V=S\times(W+H)/\{2\times \mathrm{Max}(W,H)\} \tag{3}$$

$$V=S\times\sqrt{S}/\mathrm{Max}(W,H) \tag{4}$$

$$V=S\times\{\mathrm{Min}(W,H)/\mathrm{Max}(W,H)\}\times\{S/(W\times H)\} \tag{5}$$

According to one of equations (2) to (5), the apparent size V can be simply calculated. However, since a calculation result roughly proportional to the apparent size need only be obtained, information other than the number of pixels and region range data may be used. As will be described in detail later, using features of the region shape obtained from the information stored in the label storage area, e.g., the width Wc and height Hc of a region central portion, the apparent size V may be calculated by:

$$V=S\times \mathrm{Min}(Wc,Hc)/\mathrm{Max}(Wc,Hc) \tag{6}$$

Since the apparent size V of the region is calculated (S2204), the influence of appearance due to the region shape can be prevented compared to a case wherein the size of the region is simply determined based only on the number of pixels, thus obtaining information roughly proportional to the size of the region. According to equation (6), the apparent size V grows as large as the number of pixels S of the region increases, and that grows as large as the shape of the region approaches a round shape.

Next, the size calculator 220 stores the apparent size V in the region information storage area (S2205), increments the counter M (S2206), and compares M and Lmax (S2207). If M≦Lmax, the process returns to step S2203; if M>Lmax, the processing ends.

Note that the apparent sizes of respective regions may be calculated at the same time after completion of the region segmentation by the region segmentation unit 210. Alternatively, the apparent size may be calculated every time one region is segmented.

[Correction Coefficient Calculator]

Figure 5:
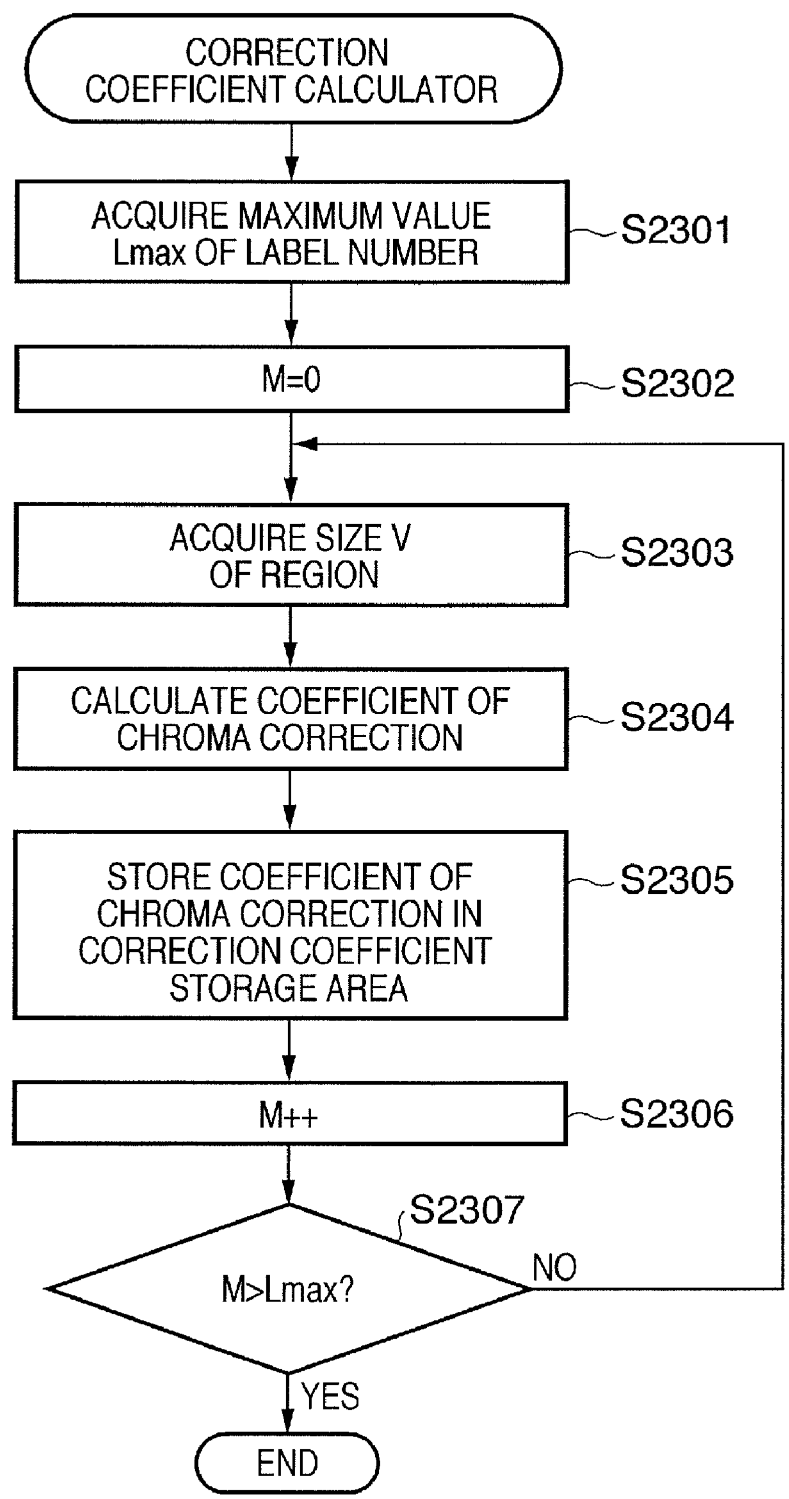
FIG. 5 is a flowchart showing the processing of a correction coefficient calculator.

FIG. 5 is a flowchart showing the processing of the correction coefficient calculator 230.

The correction coefficient calculator 230 calculates a coefficient of chroma correction indicating the degree of chroma emphasis to be applied to an image. If the coefficient of chroma correction is large, strong chroma emphasis is applied to an image; otherwise, weak chroma emphasis is applied to an image. Of course, if the coefficient of chroma correction is zero, no chroma emphasis is applied to an image. Therefore, in order to correct the area effect of colors with which the chroma of a region with a larger apparent size looks high compared to that of a region with a small apparent size, the coefficient of chroma correction is set to be smaller for a region with a larger apparent size.

The correction coefficient calculator 230 acquires the maximum value Lmax of the label number from the region information storage area (S2301), and initializes a counter M to zero (S2302).

The correction coefficient calculator 230 acquires the apparent size V of a region corresponding to the value of the counter M from the region information storage area (S2303), and calculates a coefficient C of chroma correction (S2304).

Figure 6:
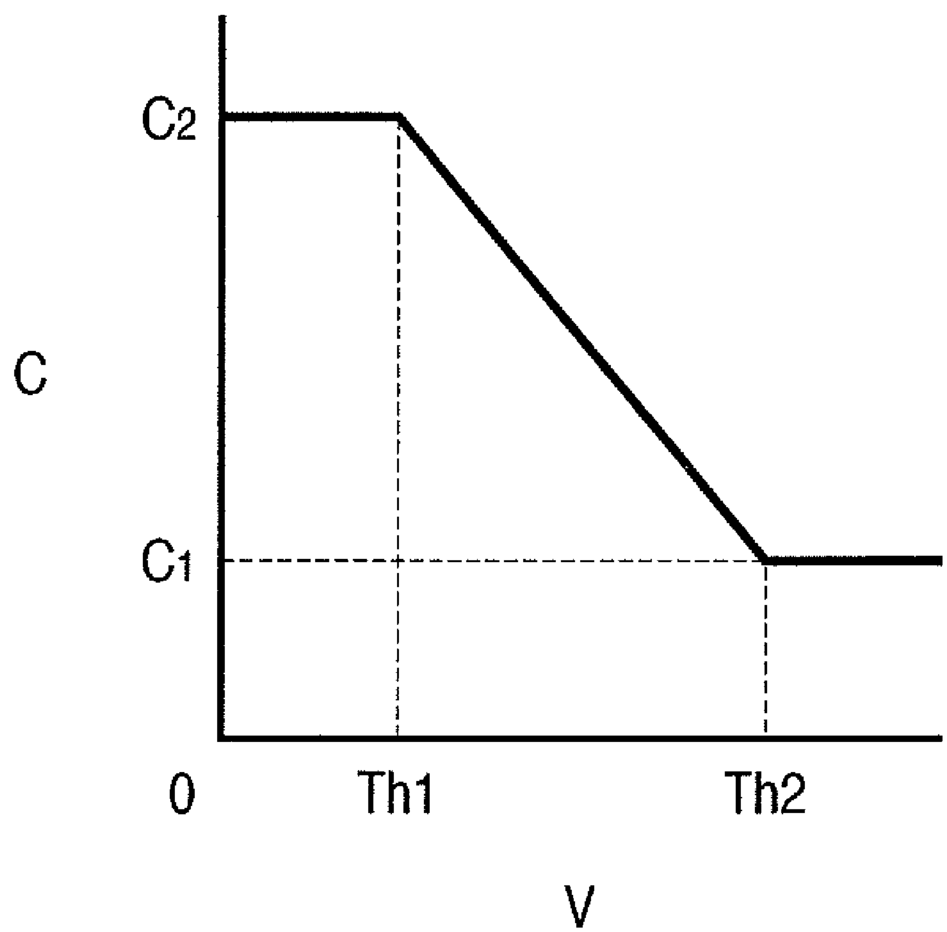
FIG. 6 is a graph showing an example of a function used to calculate a coefficient of chroma correction.

FIG. 6 shows an example of a function used to calculate the coefficient of chroma correction. In FIG. 6, the abscissa plots the apparent size V, and the ordinate plots the coefficient C of chroma correction.

As shown in FIG. 6, if V≦Th1, the coefficient C of chroma correction is fixed to C2; if V≧Th2, it is fixed to C1. If Th1<V<Th2, the coefficient C of chroma correction has characteristics in which it linearly decreases from C2 to C1 with increasing V.

Therefore, the coefficient C of chroma correction is expressed by:

If V≦Th1:

$$C=C2$$

If Th1<V≧Th2:

$$C=\{(C2-C1)V+(C1\times Th1-C2\times Th2)\}/(Th1-Th2) \tag{7}$$

If V≧Th2:

$$C=C1$$

for Th1<Th2 and C1<C2.

As is known, the area effect of colors occurs up to a visual angle of about 20°. Assuming that the visual distance is three times of the height of a frame, the height of the frame is about 18.9° as visual angle conversion. Therefore, the threshold Th2 preferably assumes a value obtained by multiplying the number of pixels of an image in the vertical direction by tan 20°/tan 18.9°≈1.06 and raising the product to the second power. For example, when the number of pixels is 1920 (horizontal)×1080 (vertical), Th2 is given by:

$$Th2=(1080\times 1.06)^2\approx 1,310,000$$

As the threshold Th1, the threshold Nth used upon determining a region with a small number of pixels (S2113) is preferably used.

Also, C1 and C2 can assume arbitrary values as long as C1<C2 holds. However, it is preferable to set C2=1 since the strong chroma correction is applied to a region with a small apparent size in the chroma correction processing. In order to skip the chroma correction for a region with a large apparent size, when the amount of chroma correction assumes a predetermined value, C1 preferably assumes the reciprocal number of the amount of chroma correction.

The coefficient C of chroma correction when Th1<V<Th2 linearly decreases from C2 to C1 with increasing V. Alternatively, C may nonlinearly decrease as long as it monotonically decreases with increasing V.

Next, the correction coefficient calculator 230 stores the calculated coefficient C of chroma correction in an element of the correction coefficient storage area corresponding to the pixel appended with a label number that matches the value (label number) of the counter M (S2305).

The correction coefficient calculator 230 increments the value of the counter M (S2306), and compares M and Lmax (S2307) If M≦Lmax, the process returns to step S2303 to calculate the coefficient C of chroma correction for another region; if M>Lmax, the processing ends.

Note that the coefficients of chroma correction for respective regions may be simultaneously calculated after completion of the calculations of the apparent sizes by the size calculator 220. Alternatively, the coefficient of chroma correction may be calculated every time the apparent size of one region is calculated.

[Filter Processor]

The filter processor 240 applies two-dimensional filtering to the coefficients C of chroma correction stored in the correction coefficient storage area. This filtering makes the coefficients C of chroma correction change smoothly at the boundary of regions since they may change abruptly at the boundary of regions. Also, this filtering can reduce a large difference between the coefficient C of chroma correction of a region formed by several pixels (to be referred to as an “isolation region” hereinafter) and those of surrounding regions. As the type of filter, smoothing filters such as an average value filter, Gaussian filter, median filter, and the like can be applied. In this embodiment, an average value filter is suitably used in consideration of a reduction of a spatial change in coefficient C of chroma correction and simple processing.

[Chroma Corrector]

Figure 7:
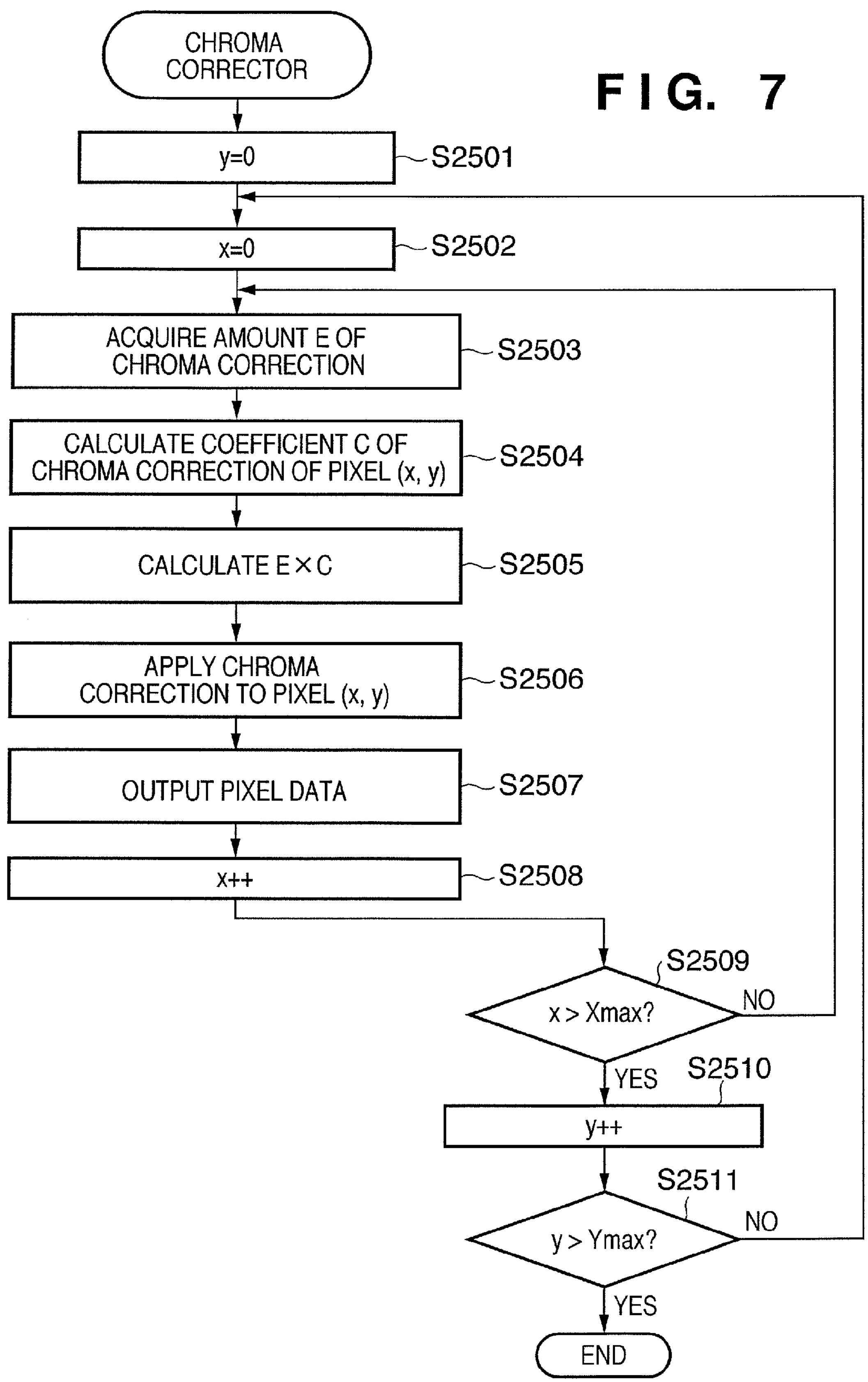
FIG. 7 is a flowchart showing the processing of a chroma corrector.

FIG. 7 is a flowchart showing the processing of the chroma corrector 250. The chroma corrector 250 adjusts the amount of chroma correction to be applied to each pixel for the purpose of a chroma emphasis effect in accordance with the coefficient of chroma correction.

The chroma corrector 250 sets the y address to 0 (top end) (S2501) and the x address to 0 (left end) (S2502).

Next, the chroma corrector 250 acquires an amount E of chroma correction from the memory 201(S2503). The amount E of chroma correction may be either a uniform value for the entire image or a different value for each pixel. Also, the amount E of chroma correction may always be a predetermined value or may change according to a user's operation. When the amount E of chroma correction is different for each pixel, the amount E of chroma correction corresponding to the current address (x, y) must be acquired.

The chroma corrector 250 acquires the coefficient C of chroma correction corresponding to the address (x, y) from the chroma correction storage area (S2504), and multiplies the amount E of chroma correction by the coefficient C of chroma correction (S2505). The corrector 250 applies chroma correction of the product EC to a pixel at the address (x, y) (S2506). When the image data is expressed by lightness, hue, and chroma data, the corrector 250 may multiply the chroma data by the product EC. When the image data is expressed by luminance and color-difference signals, the corrector 250 may convert color-difference signals Cb and Cr so that Cb and Cr become zero for an achromatic color, may multiply the converted Cb and Cr by the product EC, and then may re-convert them to original color-difference signals.

Equations (8) below show a calculation example for Cb when an image is expressed by an 8-bit digital signal. The same applies to Cr.

$$Cb2=Cb-128$$

$$Cb3=Cb2\times EC$$

$$Cb'=Cb3+128 \tag{8}$$

where Cb' is a Cb color-difference signal after correction output from the chroma corrector 250.

If the chroma data of a pixel is saturated due to the chroma correction, processing for clipping it to the upper or lower limit value of the chroma data (or color-difference signal) is applied.

The chroma corrector 250 outputs the pixel data that has undergone the chroma correction (S2507), increments the x address (S2508), and compares the x address value and a maximum value Xmax of the x address (S2509). If x≦Xmax, the process returns to step S2503 to repeat the processes in steps S2503 to S2508. If x>Xmax, the corrector 250 increments the y address (S2510), and compares the y address value and a maximum value Ymax of the y address (S2511). If y≦Ymax, the process returns to step S2502 to repeat the processes in steps S2502 to S2510. If y>Ymax, the chroma correction ends.

[Respective Processors and Storage Areas]

Figure 8:
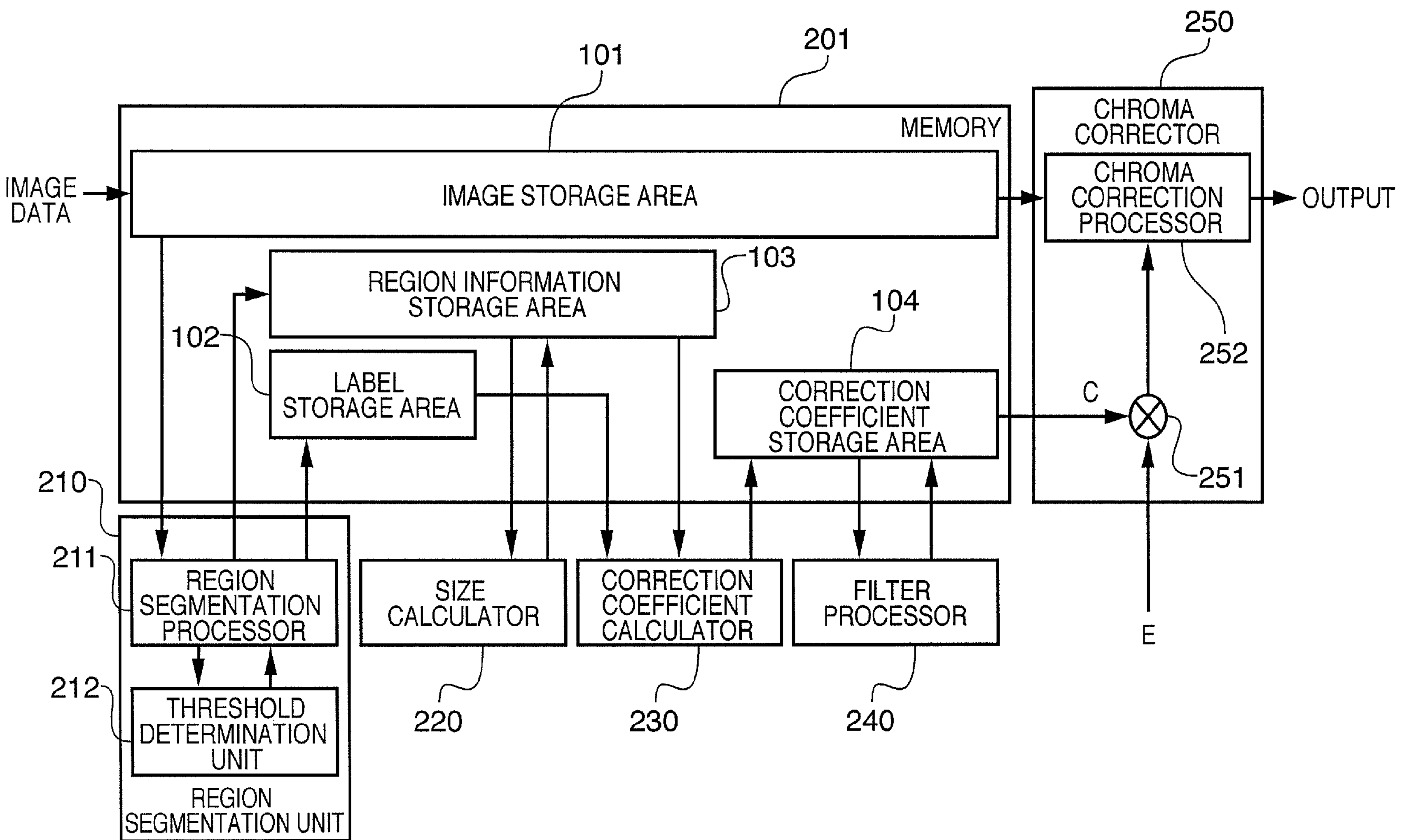
FIG. 8 is a block diagram for explaining the relationship between respective processors and storage areas.

FIG. 8 is a block diagram for explaining the relationship between the respective processors and storage areas.

In the region segmentation unit 210, a region segmentation processor 211 reads out image data stored in an image storage area 101, and executes region segmentation. A threshold determination unit 212 compares the number N of pixels of a region segmented by the region segmentation processor 211 with the threshold Nth. If N≧Nth, the unit 212 outputs the label number L of that region to the region segmentation processor 211. If N<Nth, the unit 212 outputs the label number L=0 to the region segmentation processor 211. The region segmentation processor 211 stores the label number L received from the threshold determination unit 212 in a label storage area 102. The region segmentation processor 211 stores region information of the segmented region in a region information storage area 103.

The size calculator 220 acquires region information from the region information storage area 103, calculates the apparent size of the region based on the region range data and the number N of pixels, and stores the calculation result in the region information storage area 103.

The correction coefficient calculator 230 acquires the apparent size V of the region from the region information storage area 103, and calculates a coefficient C of chroma correction. The calculator 230 searches the label storage area 102 for a pixel appended with the label number of the focused region, and stores the coefficient C of chroma correction at the corresponding position of a correction coefficient storage area 104. Therefore, the correction coefficient storage area 104 two-dimensionally stores the coefficients C of chroma correction in correspondence with pixel positions.

The filter processor 240 applies two-dimensional filtering to the coefficients C of chroma correction stored in the correction coefficient storage area 104.

The chroma corrector 250 acquires the coefficient C of chroma correction stored in the correction coefficient storage area 104 for each pixel, and multiplies the amount E of chroma correction by the coefficient C of chroma correction using a multiplier 251. A chroma correction processor 252 reads out image data stored in the image storage area 101 for each pixel, applies chroma correction according to the output from the multiplier 251, and outputs pixel data that has undergone the chroma correction.

PROCESSING EXAMPLE 1

FIGS. 9 to 13 show data examples stored in the respective storage areas upon application of the aforementioned image processing to a certain image. Note that respective parameters are Nth=1, Th1=5, Th2=1310000, C1=0.667, C2=1, and amount E of chroma correction=1.5. Also, in the region segmentation, the difference ranges of feature amounts within which an adjacent pixel that belongs to the focused region is determined are Y=±15, Cb=±10, and Cr=±10. Furthermore, filtering of the coefficient C of chroma correction is skipped.

FIG. 9 shows image data of an input image, i.e., YCbCr data stored in the image storage area 101. Note that FIG. 9 shows 8-bit image data defined by ITU-RBT.709, data ranges are 16≦Y≦235, 16≦Cb≦240, and 16≦Cr≦240, and Cb=Cr=128 represents an achromatic color.

FIG. 10 shows the region segmentation result of the image data shown in FIG. 9, i.e., data stored in the label storage area 102. Numerical values described in respective pixels in FIG. 10 are label numbers.

FIG. 11 shows region information of respective regions, i.e., data stored in the region information storage area 103 after the region segmentation and calculations of the apparent sizes.

FIG. 11 describes the label number, feature amounts (of an origin pixel), addresses of the ends of every directions, number of pixels, and apparent size, but the feature amounts are not indispensable. For example, in a region with a label number L=1, the feature amounts of the origin pixel are Y=120, Cb=201, and Cr=55. This region has an upper left end (X0, Y0)=(0, 0), a lower right end (X1, Y1)=(270, 380), the number N of pixels=73201, and an apparent size V=52067.

The number N of pixels of a region with a label number L=2 (region 2) is roughly the same as that of a region with L=107 (region 107). However, these regions have different apparent sizes V, i.e., the apparent size V=333,917 for region 2, and V=197,026 for region 107, and region 2 is apparently larger, as can be seen from FIG. 11. This is because the width and height of region 2 are W=920 and H=606, while those of region 107 are W=461 and H=1192, and region 107 has a flat shape and is apparently small.

FIG. 12 shows coefficients of chroma correction of respective pixels, i.e., data stored in the correction coefficient storage area 104.

FIG. 13 shows image data after chroma correction, i.e., data output from the chroma corrector 250. Upon comparison of color-difference signals of pixel (0, 0) in FIGS. 9 and 13, Cb=201→236 and Cr=55→19, and the chroma data is emphasized. Pixels (0, 0) and (1918, 1078) assume the same value when they are input, but assume different values when they are output. This is because these pixels belong to different regions, and undergo chroma correction based on the coefficients C of chroma correction which are calculated based on the apparent sizes of the respective regions.

Cr of pixel (2, 0) assumes a value less than 16 after chroma correction, but it is clipped to 16 to meet the standard of the image signal. Likewise, since Cb and Cr cannot assume values exceeding 240, if they assume values exceeding 240 after chroma correction, these values are clipped to 240. When the signal value falls outside the standard range, processing for converting it to fall within a standard range such as gamut mapping and the like may be executed in place of clipping.

In this way, the apparent size is calculated, and the coefficient C of chroma correction is calculated based on the apparent size to apply chroma correction to the image. Therefore, chroma correction suited to the apparent size can be applied to the focused region. Since each segmented region is not limited to that of a specific color such as a memory color or the like, chroma correction suited to the apparent size can be applied to a region of an arbitrary color.

PROCESSING EXAMPLE 2

FIGS. 14 to 17 show data examples stored in the respective storage areas upon application of the aforementioned image processing to a certain image. Note that respective parameters are Nth=8295 (a maximum of 250 regions), Th1=8295, Th2=1310000, C1=0.667, C2=1, and amount E of chroma correction=1.5. Also, in the region segmentation, the difference ranges of feature amounts within which an adjacent pixel that belongs to the focused region is determined are Y=±15, Cb=±10, and Cr=±10. Furthermore, filtering of the coefficient C of chroma correction is skipped.

Image data of an input image is the same as that shown in FIG. 9.

FIG. 14 shows the region segmentation result of the image data shown in FIG. 9, i.e., data stored in the label storage area 102. Numerical values described in respective pixels in FIG. 14 are label numbers.

FIG. 15 shows region information of respective regions, i.e., data stored in the region information storage area 103 after the region segmentation and calculations of the apparent sizes.

Upon comparison of Processing Examples 1 and 2, pixels of both a region with a label number L=28 (region 28) and a region with L=191 (region 191) in Processing Example 1 are appended with a label number L=0 in Processing Example 2. Since the numbers N of pixels of these regions are less than the threshold Nth=8295, their label numbers L are rewritten to 0 in Processing Example 2. Therefore, 202 regions recorded in the region information shown in FIG. 11 are reduced to 22 region in that shown in FIG. 15.

FIG. 16 shows coefficients of chroma correction of respective pixels, i.e., data stored in the correction coefficient storage area 104. Since Processing Examples 1 and 2 use different Th1 values, they also have different values of coefficients of chroma correction of respective pixels. For example, the coefficient of chroma correction of pixel (0, 0) is 0.987 in Processing Example 1, but it is 0.989 in Processing Example 2.

FIG. 17 shows image data after chroma correction, i.e., data output from the chroma corrector 250. Since Processing Examples 1 and 2 use different Th1 values, they also have different values of coefficients of chroma correction of respective pixels. For example, image data of pixel (1918, 1) is expressed by Y=81, Cb=61, and Cr=160 in Processing Example 1, but it is expressed by Y=81, Cb=60, and Cr=160 in Processing Example 2.

In this way, small regions and isolation regions each having a small number of pixels are avoided from being labeled (segmented). As a result, as for an image including many small regions and isolation regions due to noise or the like, a problem of too long calculation processing times of the sizes and coefficients of chroma correction due to too large a number of segmented regions can be solved.

PROCESSING EXAMPLE 3

FIG. 18 shows a data example stored in the correction coefficient storage area 104 after a certain image undergoes the aforementioned image processing and filtering. Note that respective parameters are Nth=8295 (a maximum of 250 regions), Th1=8295, Th2=1310000, C1=0.667, C2=1, and amount E of chroma correction=1.5. Also, in the region segmentation, the difference ranges of feature amounts within which an adjacent pixel that belongs to the focused region is determined are Y=±15, Cb=±10, and Cr=±10. Furthermore, filtering of the coefficient C of chroma correction is executed, and an average value filter is used.

Image data of an input image is the same as that shown in FIG. 9.

As shown in FIG. 14, pixel (2, 1078) belongs to region 0, pixel (1, 1078) belongs to region 17, and these pixels define the boundary of regions. Therefore, in Processing Example 2 (FIG. 16), a coefficient C of chroma correction=1.000 for pixel (2, 1078), C=0.952 for pixel (1, 1078), and their difference Δ is 0.048. By contrast, in Processing Example 3 (FIG. 18), C=0.967 for pixel (2, 1078), C=0.963 for pixel (1, 1078), and their difference Δ=0.004. That is, in Processing Example 3, the coefficients C of chroma correction are filtered to reduce the difference Δ between the coefficients C of chroma correction of the pixels which define the boundary to 0.004, thus suppressing an abrupt change in coefficient C of chroma correction at the boundary of the regions.

In this way, by filtering the calculation results of the coefficients of chroma correction, an abrupt change in coefficient of chroma correction at the boundary of the regions can be suppressed. Also, the coefficient of chroma correction of a region with a small number of pixels can be suppressed from becoming excessively larger than those of surrounding regions.

According to the first embodiment, chroma correction can be applied in accordance with the apparent sizes of regions with different feature amounts, i.e., the chroma correction can be applied in consideration of the area effect of colors. Also, suited chroma correction can be individually applied to respective segmented regions. Furthermore, suited chroma correction can be applied without limiting to specific colors.

Second Embodiment

Image processing according to the second embodiment of the present invention will be described hereinafter. Note that the same reference numerals in the second embodiment denote the same components as those in the first embodiment, and a detailed description thereof will not be given.

In the second embodiment, the processing of the size calculator 220 is modified. That is, the width and height of a central portion of a region whose size is to be calculated are calculated using data stored in the label storage area 102, and the size of that region is calculated based on the calculation result.

Figure 19:
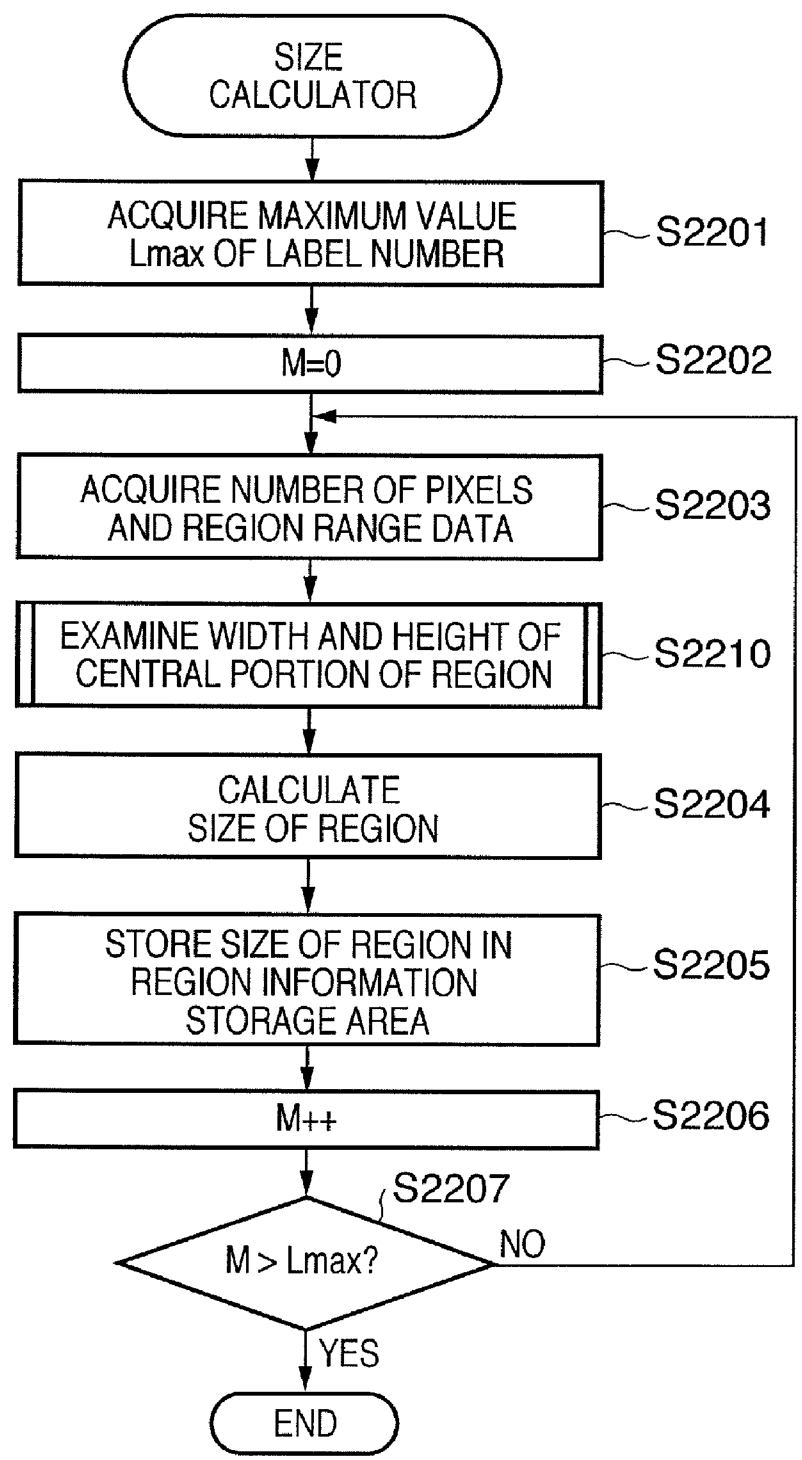
FIG. 19 is a flowchart showing the processing of a size calculator according to the second embodiment.
Figure 20:
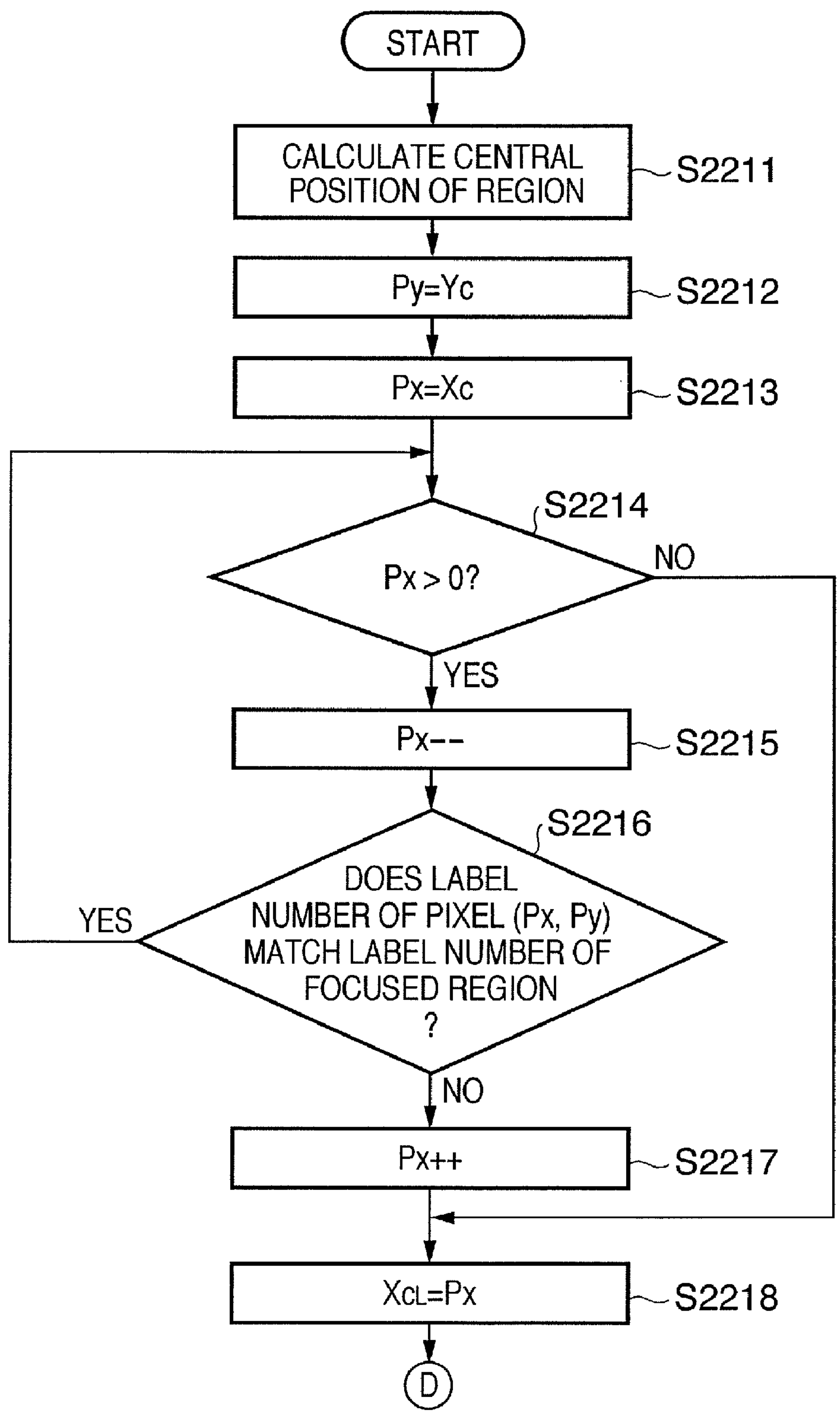
FIGS. 20 to 23 are flowcharts showing detailed processing of step S2210 shown in FIG. 19.
Figure 21:
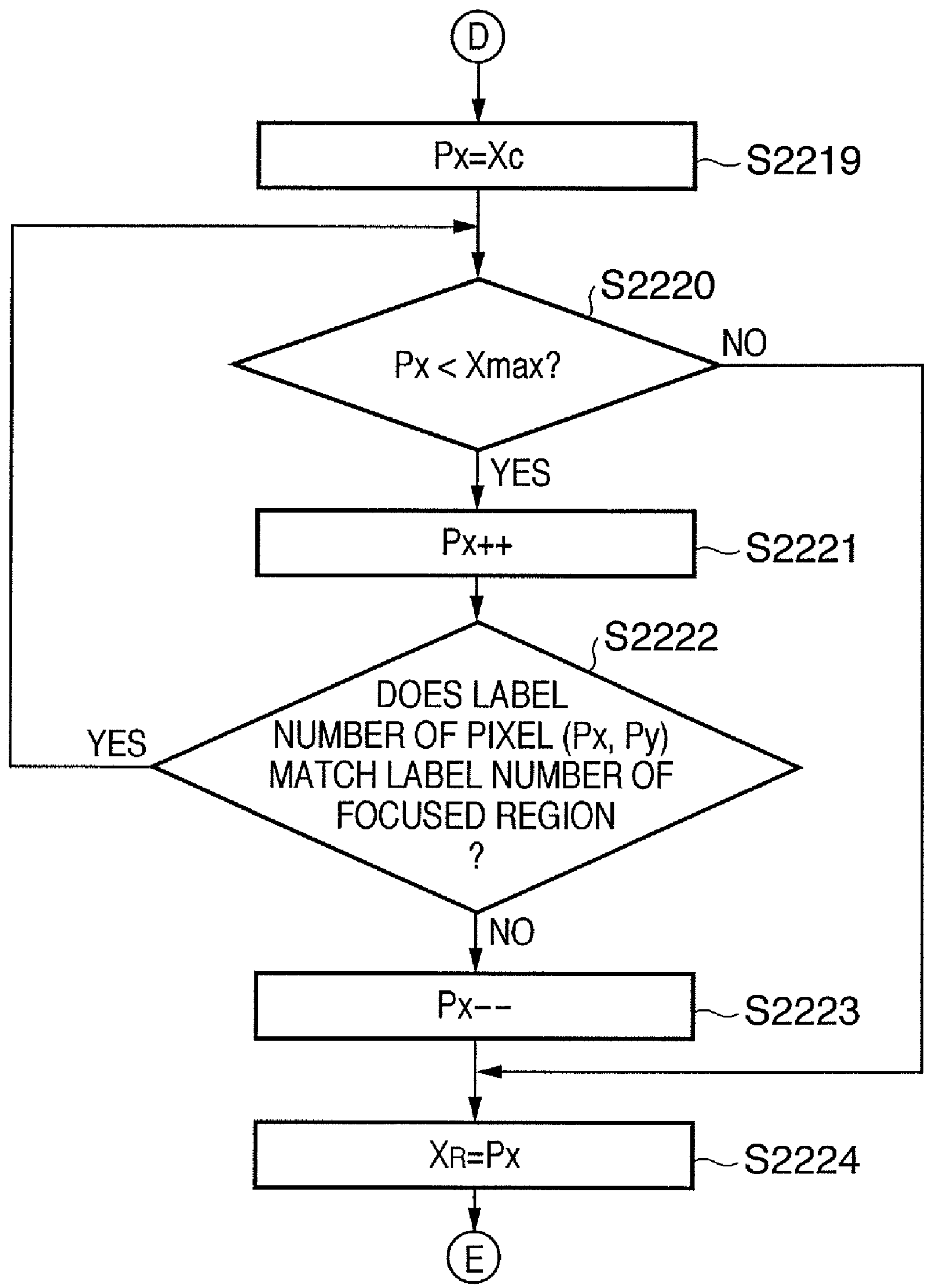
Figure 22:
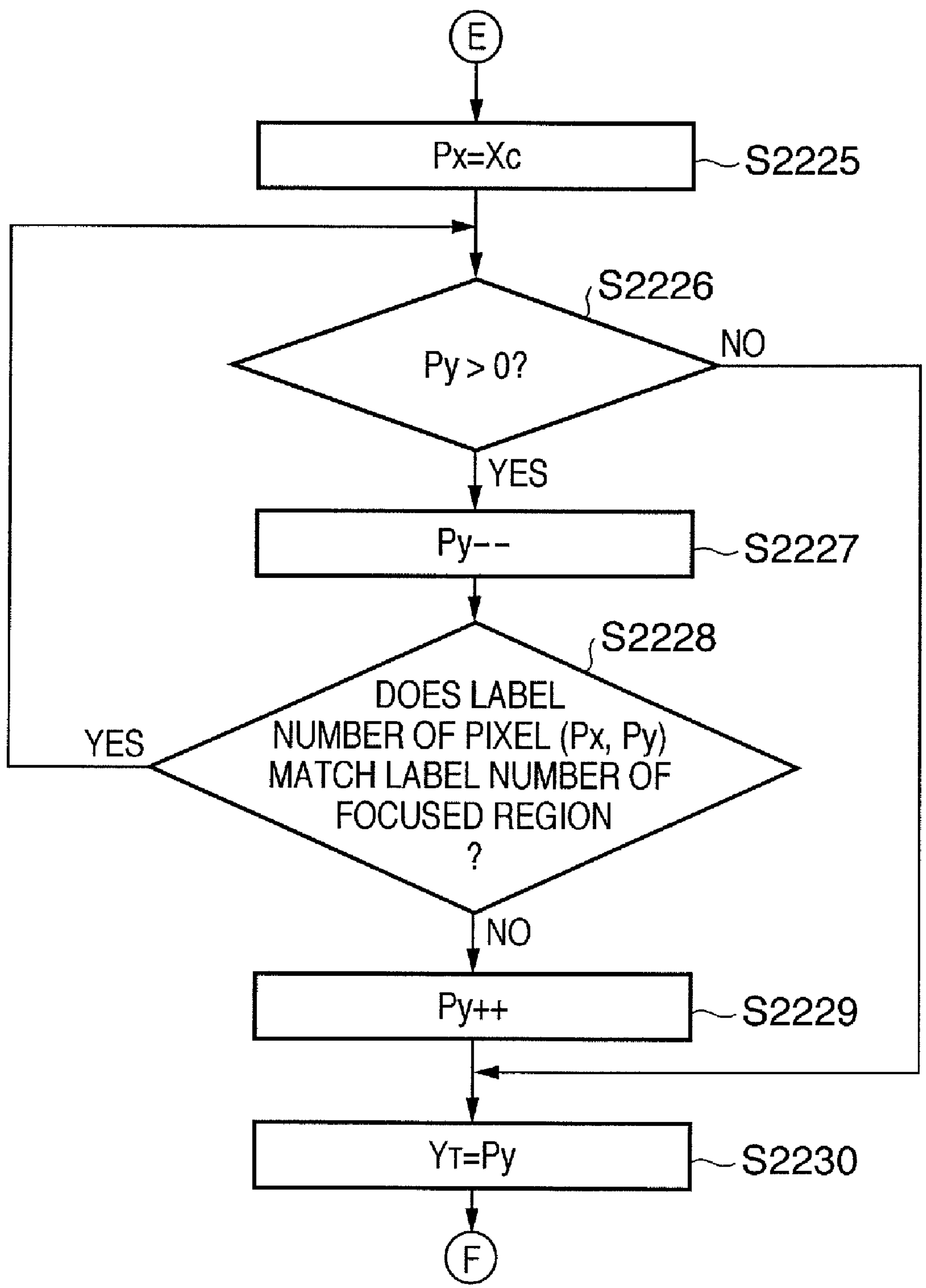
Figure 23:
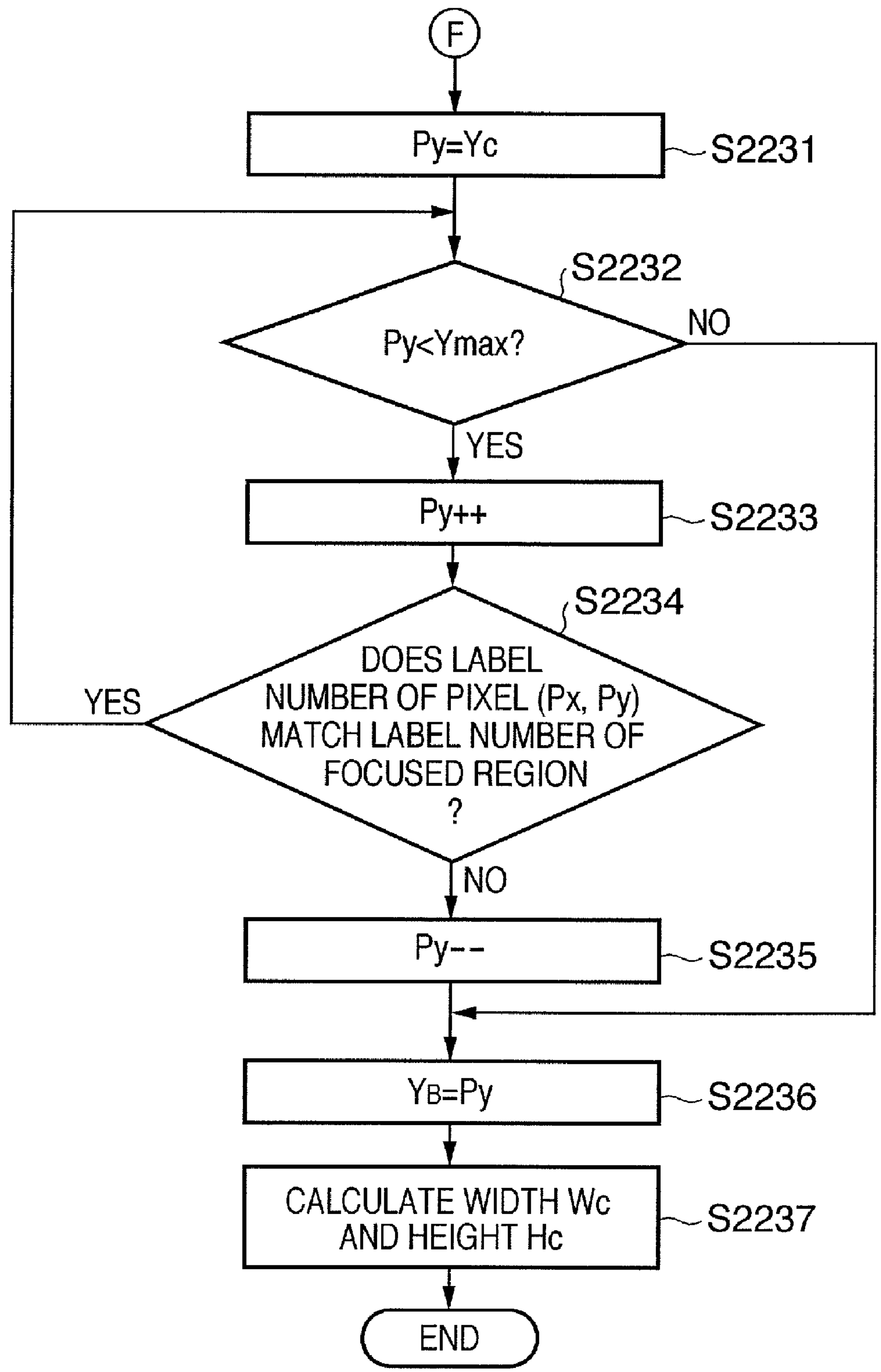

FIG. 19 is a flowchart showing the processing of the size calculator 220 according to the second embodiment.

In the processing shown in FIG. 19, step S2210 of examining the width and height of a central portion of the focused region is added between steps S2203 and S2204 of the processing shown in FIG. 4. In step S2204, the size calculator 220 calculates a size V of the focused region based on the width Wc and height Hc of the central portion of the region and the number S of pixels of the region. Note that the second embodiment uses equation (6) to calculate the size V of the region. Alternatively, any other calculation methods may be used as long as they can obtain a size V roughly proportional to the apparent size.

FIGS. 20 to 23 are flowcharts showing the detailed processing of step S2210.

The size calculator 220 calculates a central position (Xc, Yc) of the focused region (S2211) by:

$$Xc=int\{(X_R-X_L)/2\}+1$$

$$Yc=int\{(Y_B-Y_T)/2\}+1 \quad (9)$$

where int is a function of truncating fractions, $X_R$ is the x address of the right end of the region, $X_L$ is the x address of the left end of the region, $Y_B$ is the y address of the bottom end of the region, and $Y_T$ is the y address of the top end of the region.

The size calculator 220 examines pixels from the central position (Xc, Yc) of the region in the upper, lower, right, and left directions to calculate the width Wc and height Hc of the region central portion. For this purpose, the calculator 220 sets Yc in a variable Py (S2212), and Xc in a variable Px (S2213). The calculator 220 then checks if Px>0 (S2214). As a result of checking, if Px=0, since that position is the left end position of the central portion of the focused region, the process jumps to step S2218.

If Px>0, the size calculator 220 decrements Px (S2215), and checks if the label number which is stored in the label storage area 102 and is appended to pixel (Px, Py) matches the label number L of the focused region (S2216). As a result of checking, if the two label numbers match, the process returns to step S2214. If the two label numbers are different, the size calculator 220 increments Px (S2217), and the process advances to step S2218.

The size calculator 220 sets Px in a left end position $X_{CL}$ of the central portion of the focused region (S2218).

The size calculator 220 sets Px=Xc again (S2219) and checks if Px<Xmax (the maximum value of the x address) (S2220). As a result of checking, if Px=Xmax, since that position is the right end position of the central portion of the focused region, the process jumps to step S2224.

On the other hand, if Px<Xmax, the size calculator 220 increments Px (S2221), and checks if the label number which is stored in the label storage area 102 and is appended to pixel (Px, Py) matches the label number L of the focused region (S2222). As a result of checking, if the two label numbers match, the process returns to step S2220. If the two label numbers are different, the size calculator 220 decrements Px (S2223), and the process advances to step S2224.

Next, the size calculator 220 sets Px in a right end position $X_{CR}$ of the central portion of the focused region (S2224).

The size calculator 220 sets Px=Xc again (S2225) and checks if Py>0 (S2226). As a result of checking, if Py=0, since that position is the top end position of the central portion of the focused region, the process jumps to step S2230.

If Py>0, the size calculator 220 decrements Py (S2227), and checks if the label number which is stored in the label storage area 102 and is appended to pixel (Px, Py) matches the label number L of the focused region (S2228). As a result of checking, if the two label numbers match, the process returns to step S2226. On the other hand, if the two label numbers are different, the size calculator 220 increments Py (S2229), and the process advances to step S2230.

The size calculator 220 sets Py in a top end position $Y_{CT}$ of the central portion of the focused region (S2230).

The size calculator 220 sets Py=Yc again (S2231), and checks if Py<Ymax (the maximum value of the y address (S2232). As a result of checking, if Py=Ymax, since that position is the bottom end position of the central portion of the focused region, the process jumps to step S2236.

On the other hand, if Py<Ymax, the size calculator 220 increments Py (S2233), and checks the label number which is stored in the label storage area 102 and is appended to pixel (Px, Py) matches the label number L of the focused region (S2234). As a result of checking, if the two label numbers match, the process returns to step S2232. If the two label numbers are different, the size calculator 220 decrements Py (S2235) and the process advances to step S2236.

The size calculator 220 sets Py in a bottom end position $Y_{CB}$ of the central portion of the focused region (S2236).

The size calculator 220 calculates the width Wc and height Hc of the region central portion (S2237) by:

$$WC=X_{CR}-X_{CL}+1$$

$$Hc=Y_{CB}-Y_{CT}+1 \quad (10)$$

Third Embodiment

Image processing according to the third embodiment of the present invention will be described hereinafter. Note that the same reference numerals in the third embodiment denote the same components as those in the first and second embodiments, and a detailed description thereof will not be given.

In the third embodiment, the processing of the region segmentation unit 210 is modified. That is, in the first embodiment, the number N of pixels of the focused region and region range data are acquired while segmenting one region. However, in the third embodiment, the number N of pixels and region range data are acquired after completion of segmentation of one region.

FIG. 24 is a flowchart showing the processing of the region segmentation unit 210 according to the third embodiment.

Referring to FIG. 24, the region segmentation unit 210 segments one region in step S2121. As the region segmentation method, for example, a region growing method, statistical hypothesis testing method, integration method, separation method, separation/integration method, K-means method, and every other region segmentation methods can be used. Especially, since counting of the number of pixels of each region and acquisition of the region range data are done after region segmentation, the region segmentation method is not particularly limited.

After one region is segmented, the region segmentation unit 210 acquires region range data in step S2122. The unit 210 acquires the region range data by raster scanning from the top end and left end of an image, but may be use any other methods.

The region segmentation unit 210 acquires the number N of pixels of the region in step S2123. The unit 210 acquires the number N of pixels by raster-scanning from the top end and left end of an image, but may be use any other methods.

Since other processes are the same as those in the first embodiment, a detailed description thereof will not be given.

Exemplary Embodiments

The present invention can be applied to a system constituted by a plurality of devices (e.g., host computer, interface, reader, printer) or to an apparatus comprising a single device (e.g., copying machine, facsimile machine).

Further, the present invention can provide a storage medium storing program code for performing the above-described processes to a computer system or apparatus (e.g., a personal computer), reading the program code, by a CPU or MPU of the computer system or apparatus, from the storage medium, then executing the program.

In this case, the program code read from the storage medium realizes the functions according to the embodiments.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, besides above-described functions according to the above embodiments can be realized by executing the program code that is read by a computer, the present invention includes a case where an OS (operating system) or the like working on the computer performs a part or entire processes in accordance with designations of the program code and realizes functions according to the above embodiments.

Furthermore, the present invention also includes a case where, after the program code read from the storage medium is written in a function expansion card which is inserted into the computer or in a memory provided in a function expansion unit which is connected to the computer, CPU or the like contained in the function expansion card or unit performs a part or entire process in accordance with designations of the program code and realizes functions of the above embodiments.

In a case where the present invention is applied to the aforesaid storage medium, the storage medium stores program code corresponding to the flowcharts described in the embodiments.

While the present invention has been described with reference to exemplary embodiments, it is to be understood that the invention is not limited to the disclosed exemplary embodiments. The scope of the following claims is to be accorded the broadest interpretation so as to encompass all such modification and equivalent structures and functions.

This application claims the benefit of Japanese Patent Application No. 2006-242145, filed Sep. 6, 2006, which is hereby incorporated by reference herein in its entirety.

What is claimed is:

1. An image processing apparatus comprising:

a segmentation unit, arranged to segment an input image into a plurality of regions as sets of pixels having similar feature amounts;

a calculator, arranged to calculate a size evaluation value V of an apparent size of each region segmented by the segmentation unit based on a number of pixels S and a shape of the each region, wherein the apparent size indicates a visual size of the region in the input image; and a corrector, arranged to perform chroma emphasis correction on the input image to weaken correction as a region has a larger size evaluation value V, wherein the calculator calculates the size evaluation value V using a dimension H in a vertical direction and a dimension W in a horizontal direction of the region as the shape, and a numerical formula which uses the number of pixels S, the dimension H, and the dimension W, so that the size evaluation value V grows large when a difference between the dimension H and the dimension W becomes small.

2. The apparatus according to claim 1, wherein the calculator calculates the size evaluation value V using any one of the following numerical formulas:

$$V=S\times \mathrm{Min}(W,H)/\mathrm{Max}(W,H); \quad \text{formula 1,}$$

$$V=S\times(W+H)/\{2\times \mathrm{Max}(W,H)\}; \quad \text{formula 2,}$$

$$V=S\times\sqrt{S}/\mathrm{Max}(W,H); \text{ and} \quad \text{formula 3,}$$

$$V=S\times\{\mathrm{Min}(W,H)/\mathrm{Max}(W,H)\}\{S/(W\times H)\}, \text{ and} \quad \text{formula 4,}$$

wherein the dimension W is calculated by adding one to a difference that a left end position L is subtracted from a right end position R of the region, and the dimension H is calculated by adding one to a difference that a top end position T is subtracted from a bottom end position B of the region.

3. The apparatus according to claim 1, wherein the calculator uses a dimension in the vertical direction of a central portion of the region as the dimension H in the vertical direction of the region, and uses a dimension in the horizontal direction of the central portion of the region as the dimension W in the horizontal direction of the region.

4. The apparatus according to claim 1, wherein the segmentation unit executes the segmentation using information associated with colors of an image as the feature amounts.

5. The apparatus according to claim 1, wherein the corrector individually performs the chroma emphasis correction on the regions segmented by the segmentation unit.

6. The apparatus according to claim 1, wherein when the number of pixels of the each segmented region is smaller than a predetermined number of pixels, the segmentation unit classifies pixels of that region which do not belong to any region, and the calculator sets the size evaluation value V of a set of pixels which do not belong to any region to be zero.

7. The apparatus according to claim 1, wherein the corrector comprises:

a coefficient calculator, arranged to calculate coefficients of chroma emphasis correction of the region for respective pixels in accordance with the size evaluation value V of each region, and to store the coefficients of chroma emphasis correction in a memory; and a filter, arranged to apply two-dimensional filtering to the coefficients of chroma emphasis correction stored in the memory.

8. An image processing method comprising:

using a processor to perform the steps of:

segmenting an input image into a plurality of regions as sets of pixels having similar feature amounts;

calculating a size evaluation value V of an apparent size of each segmented region based on a number of pixels S and a shape of the region, wherein the apparent size indicates a visual size of the region in the input image; and performing chroma emphasis correction on the input image to weaken correction as a region has a larger size evaluation value V, wherein the calculating step calculates the size evaluation value V using a dimension H in a vertical direction and a dimension W in a horizontal direction of the region as the shape, and a numerical formula which uses the number of pixels S, the dimension H, and the dimension W, so that the size evaluation value V grows large when a difference between the dimension H and the dimension W becomes small.

9. The method according to claim 8, wherein the calculating step calculates the size evaluation value V using any one of the following numerical formulas:

$$V=S\times \mathrm{Min}(W, H)/\mathrm{Max}(W, H); \quad \text{formula 1,}$$

$$V=S\times (W+H)/\{2\times \mathrm{Max}(W, H)\}; \quad \text{formula 2,}$$

$$V=S\times \sqrt{S}/\mathrm{Max}(W, H); \text{ and} \quad \text{formula 3,}$$

$$V=S\times \{\mathrm{Min}(W, H)/\mathrm{Max}(W, H)\}\{S/(W\times H)\}, \text{ and} \quad \text{formula 4,}$$

wherein the dimension W is calculated by adding one to a difference between a right end position R and a left end position L of the region, and the dimension H is calculated by adding one to a difference between a bottom end position B and a top end position T of the region.

10. The method according to claim 8, wherein the calculating step uses a dimension in the vertical direction of a central portion of the region as the dimension H in the vertical direction of the region, and uses a dimension in the horizontal direction of the central portion of the region as the dimension W in the horizontal direction of the region.

11. The method according to claim 8, wherein the segmenting step executes the segmentation using information associated with colors of an image as the feature amounts.

12. The method according to claim 8, wherein the correcting step individually performs the chroma emphasis correction on the regions segmented in the segmenting step.

13. The method according to claim 8, wherein when the number of pixels of the each segmented region is smaller than a predetermined number of pixels, the segmenting step classifies pixels of that region which do not belong to any region, and the calculating step sets the size evaluation value V of a set of pixels which do not belong to any region to be zero.

14. The method according to claim 8, wherein the correcting step comprises the steps of:

calculating coefficients of chroma emphasis correction of the region for respective pixels in accordance with the size evaluation value V of each region, and storing the coefficients of chroma emphasis correction in a memory; and applying two-dimensional filtering to the coefficients of chroma emphasis correction stored in the memory.

* * * * *